(12) United States Patent
Jinta et al.

(10) Patent No.: US 10,861,404 B2
(45) Date of Patent: Dec. 8, 2020

(54) DISPLAY DEVICE, ELECTRONIC APPARATUS, AND PROJECTION DISPLAY APPARATUS

(71) Applicant: Sony Corporation, Tokyo (JP)

(72) Inventors: Seiichiro Jinta, Kanagawa (JP); Hideo Jinnouchi, Kumamoto (JP)

(73) Assignee: Sony Corporation, Tokyo (JP)

(*) Notice: Subject to any disclaimer, the term of this patent is extended or adjusted under 35 U.S.C. 154(b) by 84 days.

(21) Appl. No.: 16/072,917

(22) PCT Filed: Dec. 27, 2016

(86) PCT No.: PCT/JP2016/088925
§ 371 (c)(1),
(2) Date: Jul. 26, 2018

(87) PCT Pub. No.: WO2017/134967
PCT Pub. Date: Aug. 10, 2017

(65) Prior Publication Data
US 2019/0035345 A1    Jan. 31, 2019

(30) Foreign Application Priority Data

Feb. 2, 2016  (JP) ................. 2016-017869

(51) Int. Cl.
*G09G 3/36* (2006.01)
*H04N 9/31* (2006.01)
(Continued)

(52) U.S. Cl.
CPC ....... *G09G 3/3614* (2013.01); *G02F 1/13306* (2013.01); *G02F 1/136286* (2013.01);
(Continued)

(58) Field of Classification Search
CPC combination set(s) only.
See application file for complete search history.

(56) References Cited

U.S. PATENT DOCUMENTS

2003/0151564 A1* 8/2003 Yamashita ........... G09G 3/3648 345/52
2003/0206149 A1* 11/2003 Yamashita ........... G09G 3/3648 345/92
(Continued)

FOREIGN PATENT DOCUMENTS

JP  2005-309282 A   11/2005
JP  2005309282 A * 11/2005 ............... G09G 3/36
(Continued)

OTHER PUBLICATIONS

International Search Report and English translation thereof dated Mar. 28, 2017 in connection with International Application No. PCT/JP2016/088925.

*Primary Examiner* — Priyank J Shah
(74) *Attorney, Agent, or Firm* — Wolf, Greenfield & Sacks, P.C.

(57) ABSTRACT

A display device according to an embodiment of the disclosure includes a first driver that sequentially selects each of pixels on a row basis, and a second driver that applies, through a signal line, an image signal to each of the pixels in a pixel row that is selected by the first driver, and that inverts a polarity of the image signal at a predetermined period. The second driver sequentially applies, to the signal line, a first precharge signal voltage having a relatively large amplitude and a second precharge signal voltage having a relatively small amplitude, prior to the application of the image signal. The second driver further controls the application of the first precharge signal voltage to cause an amount of leak of an electric current from the pixel to the signal line due to the application of the first precharge signal voltage to become smaller than that in another period for each of predetermined horizontal periods.

7 Claims, 37 Drawing Sheets

(51) Int. Cl.
*G09G 3/20* (2006.01)
*G02F 1/133* (2006.01)
*G02F 1/1362* (2006.01)
*G09G 3/00* (2006.01)

(52) U.S. Cl.
CPC ............ *G09G 3/20* (2013.01); *G09G 3/3648* (2013.01); *G09G 3/3696* (2013.01); *H04N 9/312* (2013.01); *H04N 9/3105* (2013.01); *G09G 3/002* (2013.01); *G09G 2310/0251* (2013.01); *G09G 2310/061* (2013.01); *G09G 2320/0204* (2013.01); *G09G 2320/0209* (2013.01); *G09G 2320/0233* (2013.01); *G09G 2320/0257* (2013.01); *H04N 9/3197* (2013.01)

(56) References Cited

U.S. PATENT DOCUMENTS

| | | | | |
|---|---|---|---|---|
| 2005/0001806 A1* | 1/2005 | Ohmura | ............... | G09G 3/3614 345/92 |
| 2008/0170017 A1* | 7/2008 | Jeoung | ................. | G09G 3/3648 345/87 |
| 2013/0021542 A1* | 1/2013 | Ito | ..................... | G02F 1/133 345 349/5 |
| 2014/0062984 A1* | 3/2014 | Miyatake | ............. | G09G 3/3614 345/211 |
| 2015/0154926 A1* | 6/2015 | Fujikawa | ............. | G09G 3/3688 345/204 |

FOREIGN PATENT DOCUMENTS

| | | | | |
|---|---|---|---|---|
| JP | 2006-259224 A | | 9/2006 | |
| JP | 2006259224 A | * | 9/2006 | ............... G09G 3/36 |
| JP | 2006-308712 A | | 11/2006 | |
| JP | 2008-216425 A | | 9/2008 | |
| JP | 2008-268395 A | | 11/2008 | |
| JP | 2013-156645 A | | 8/2013 | |
| JP | 2015094766 A | * | 5/2015 | ........... G09G 3/3677 |

* cited by examiner

[ FIG. 1 ]
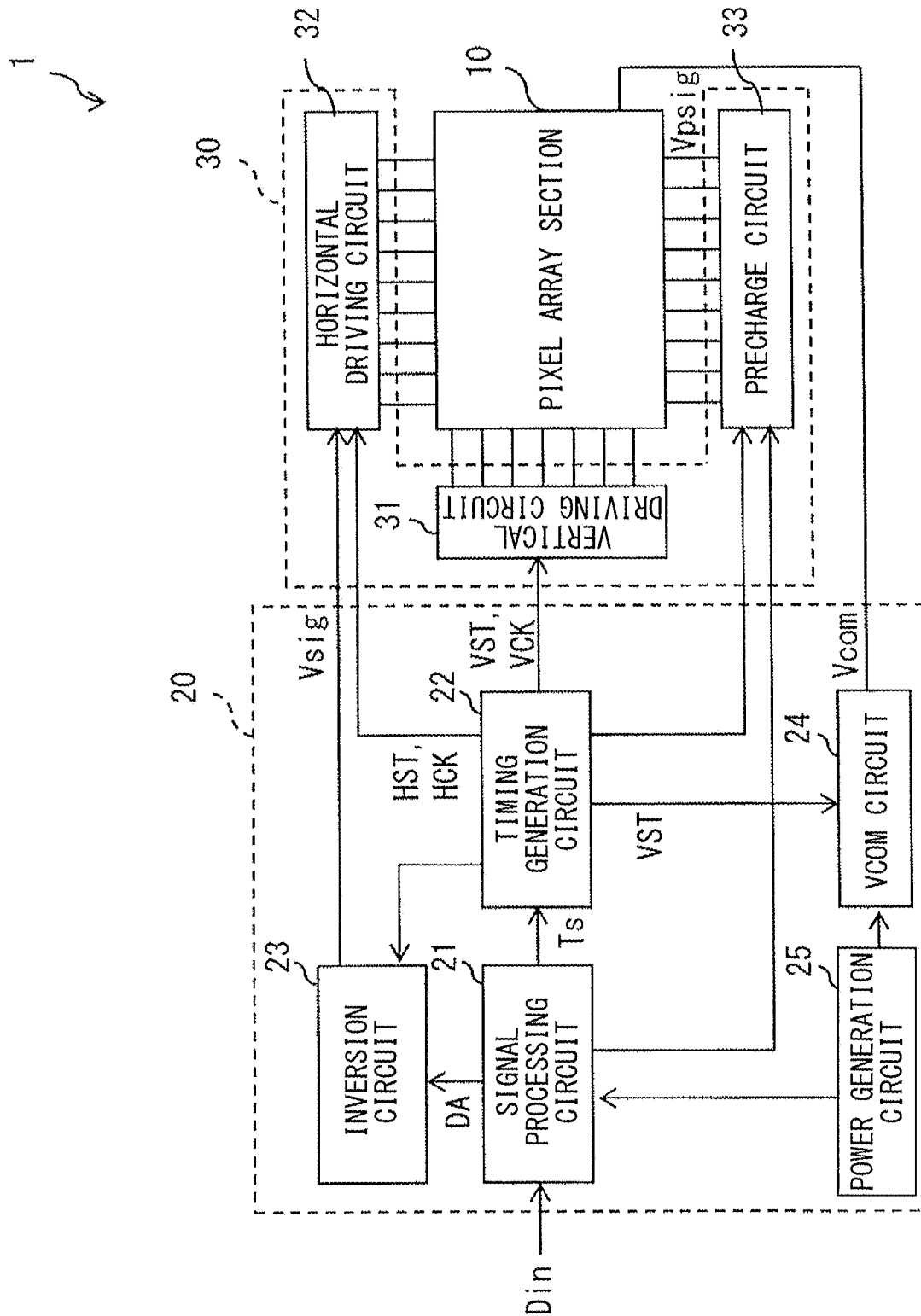

[FIG. 2]
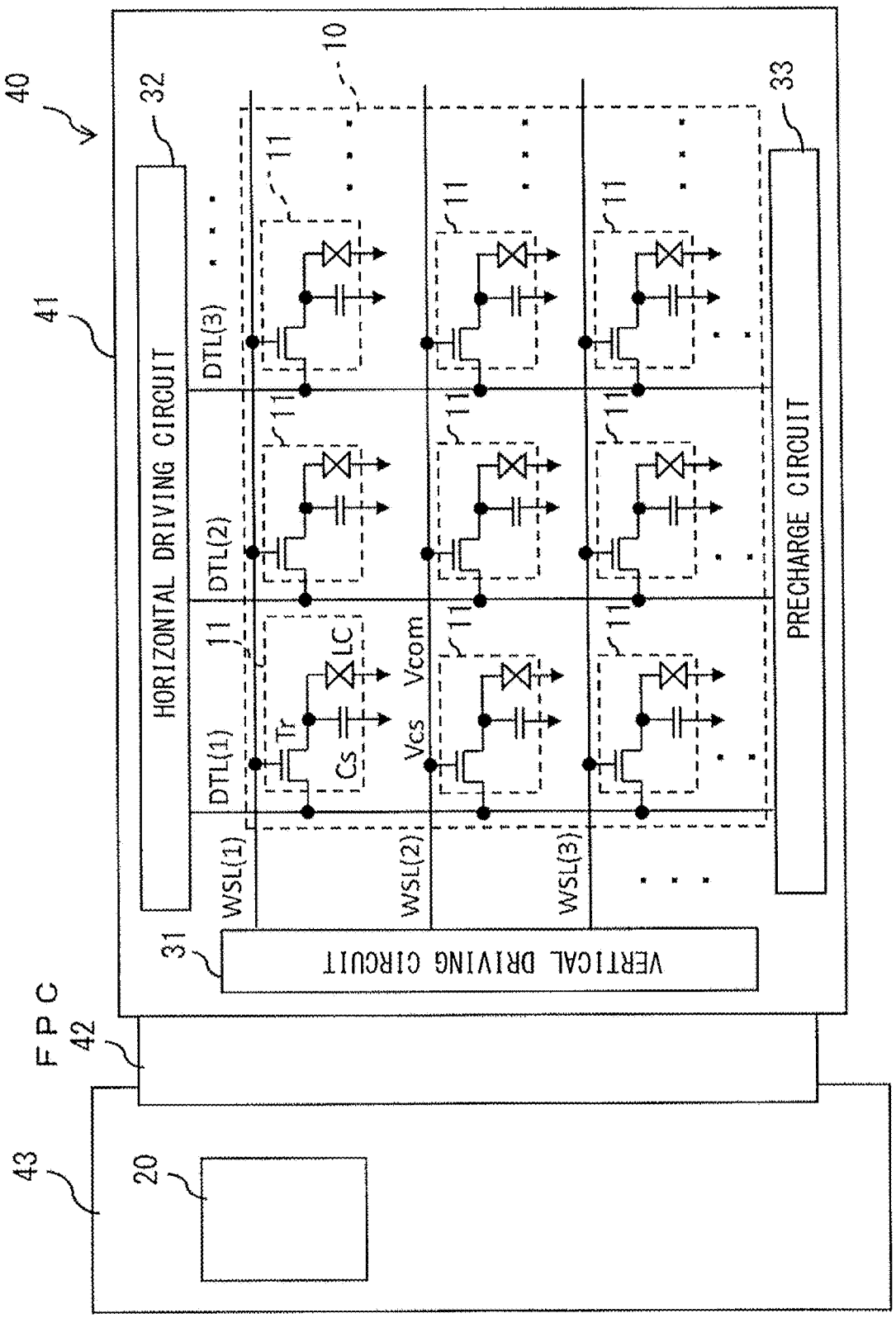

[ FIG. 3 ]
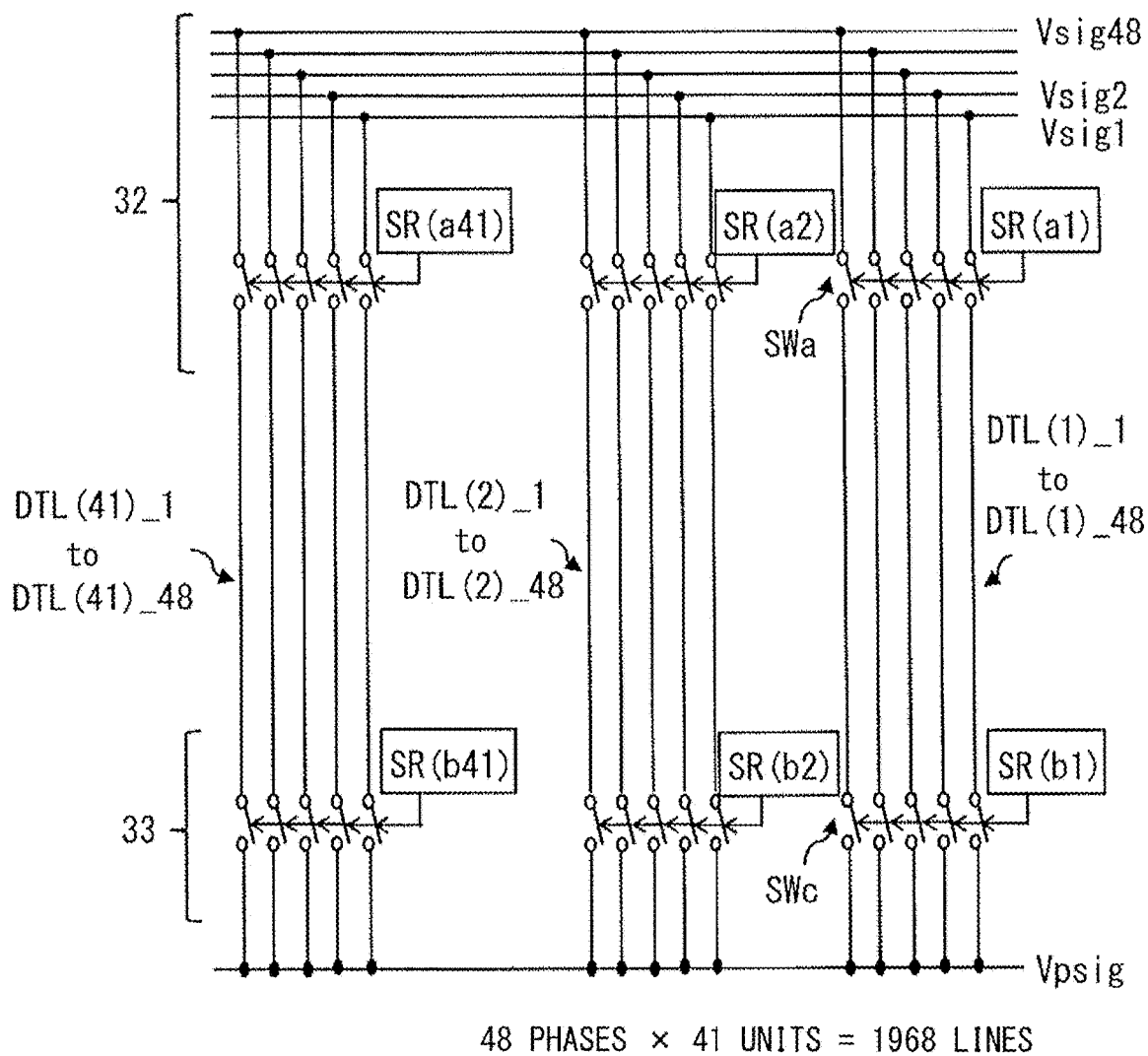

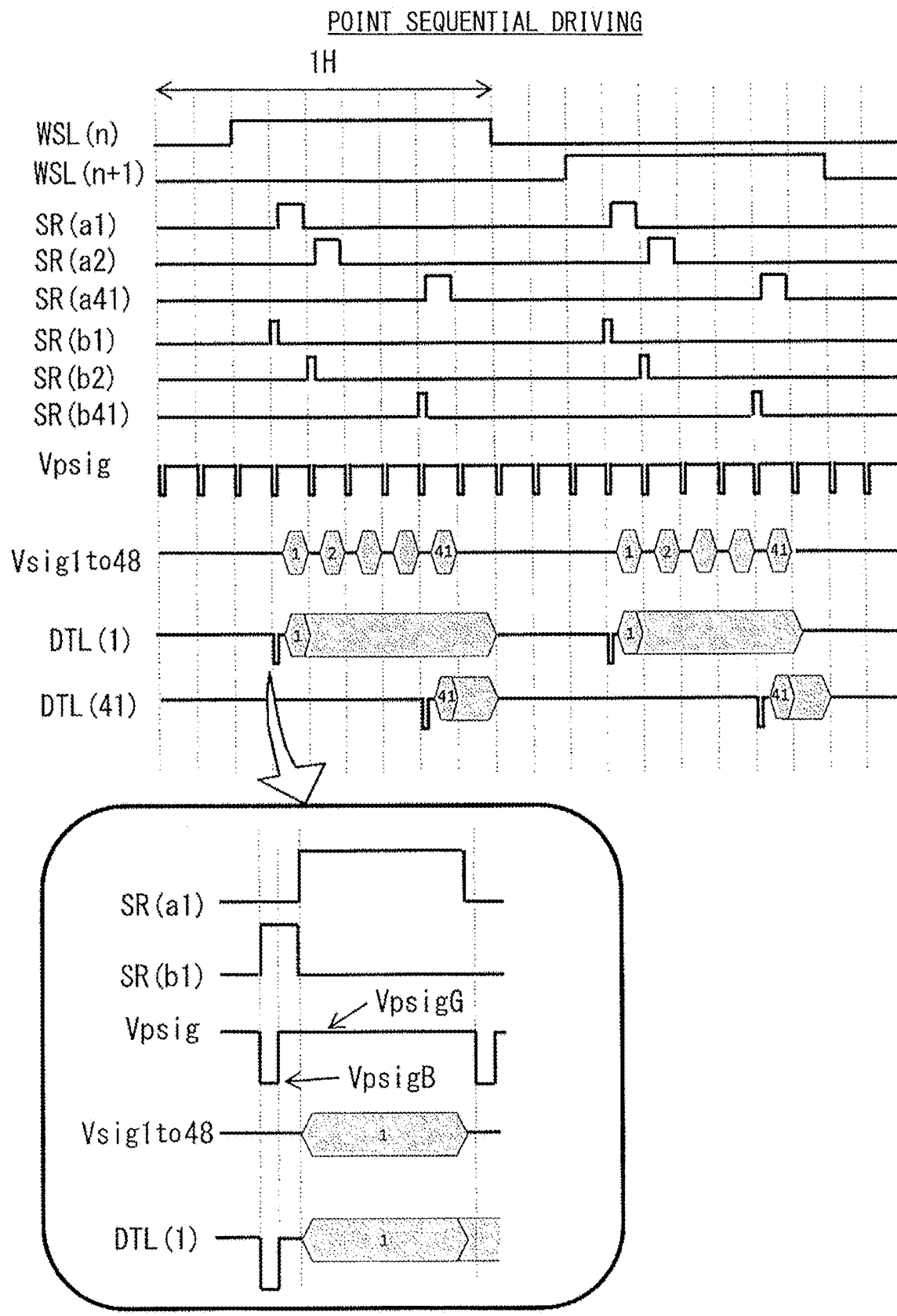
[FIG. 4]

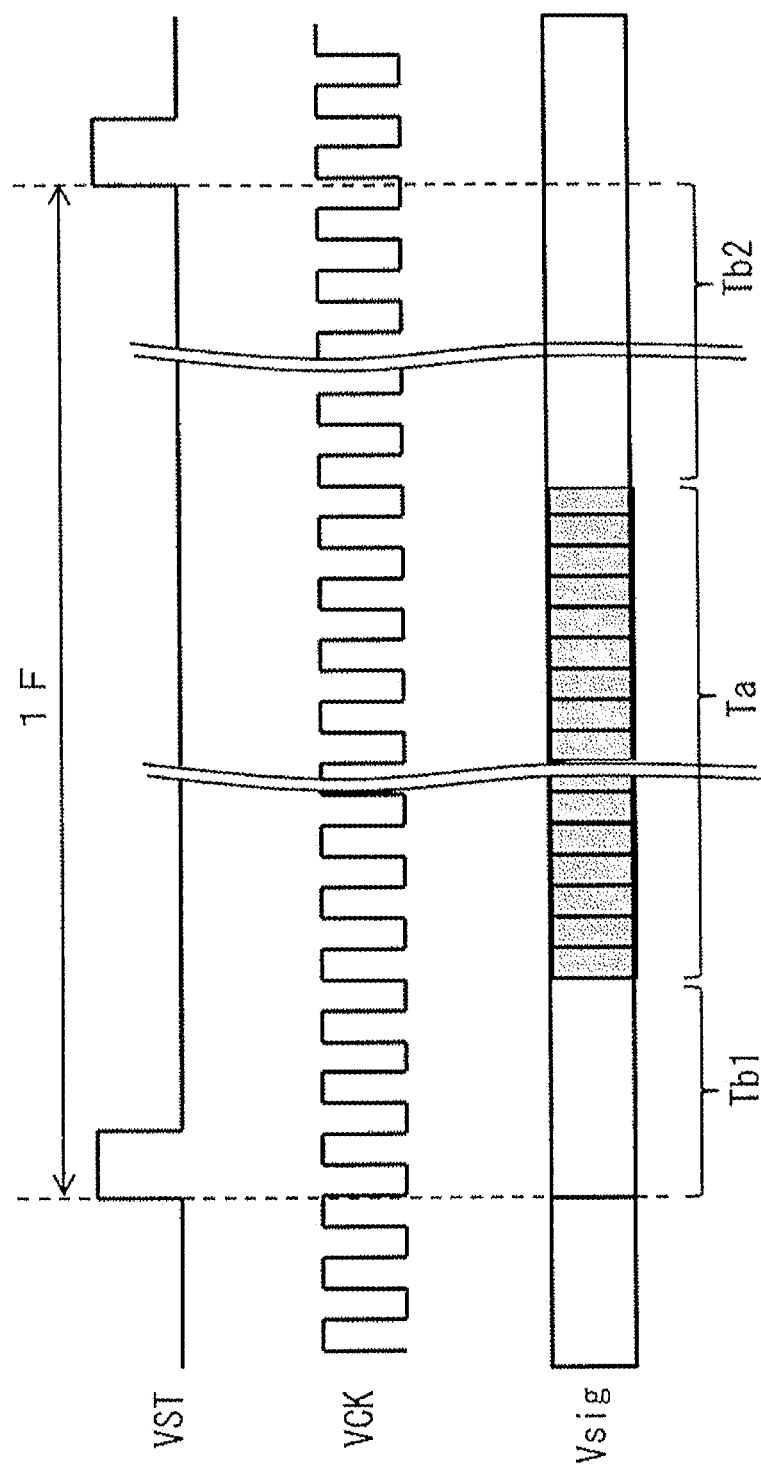
[ FIG. 5 ]

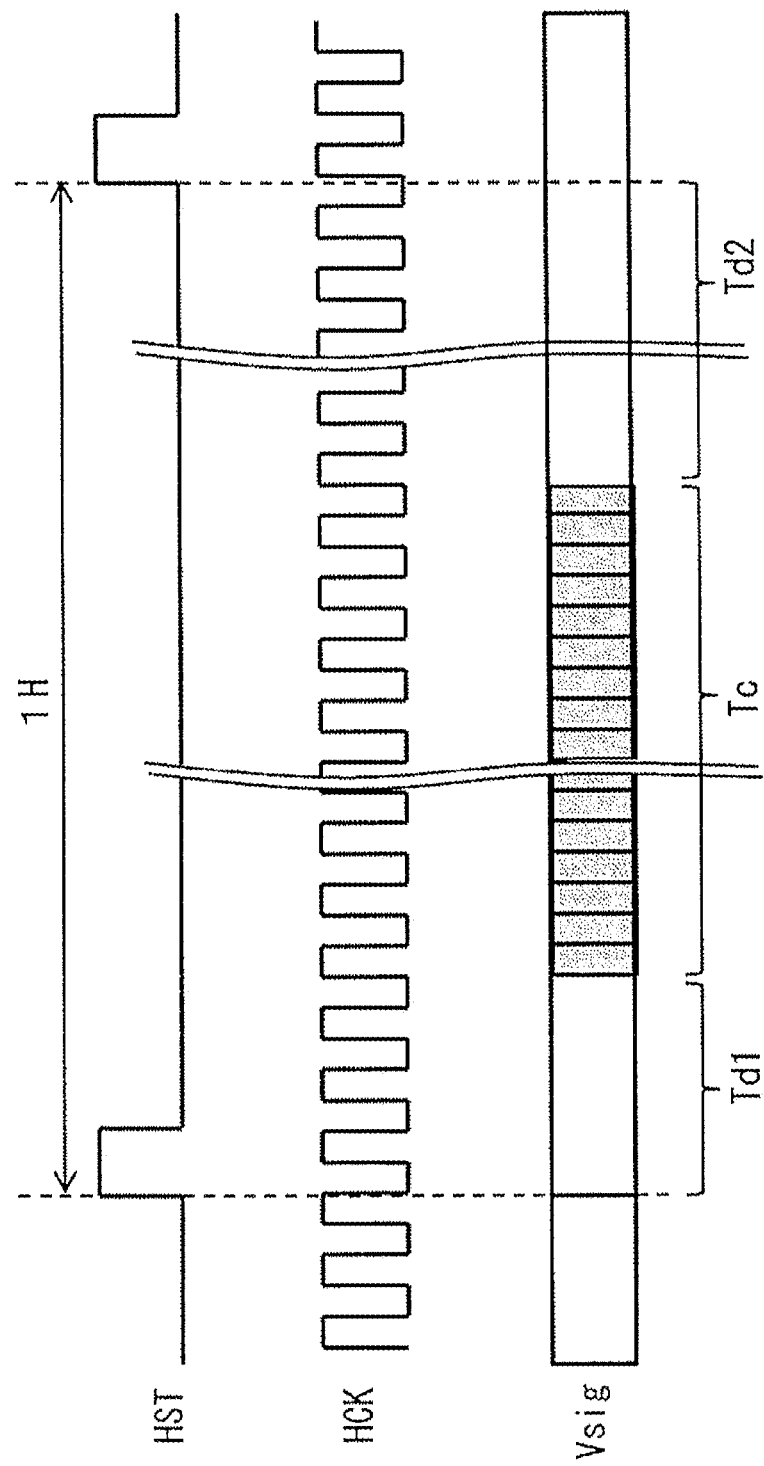
[ FIG. 6 ]

[FIG. 7]
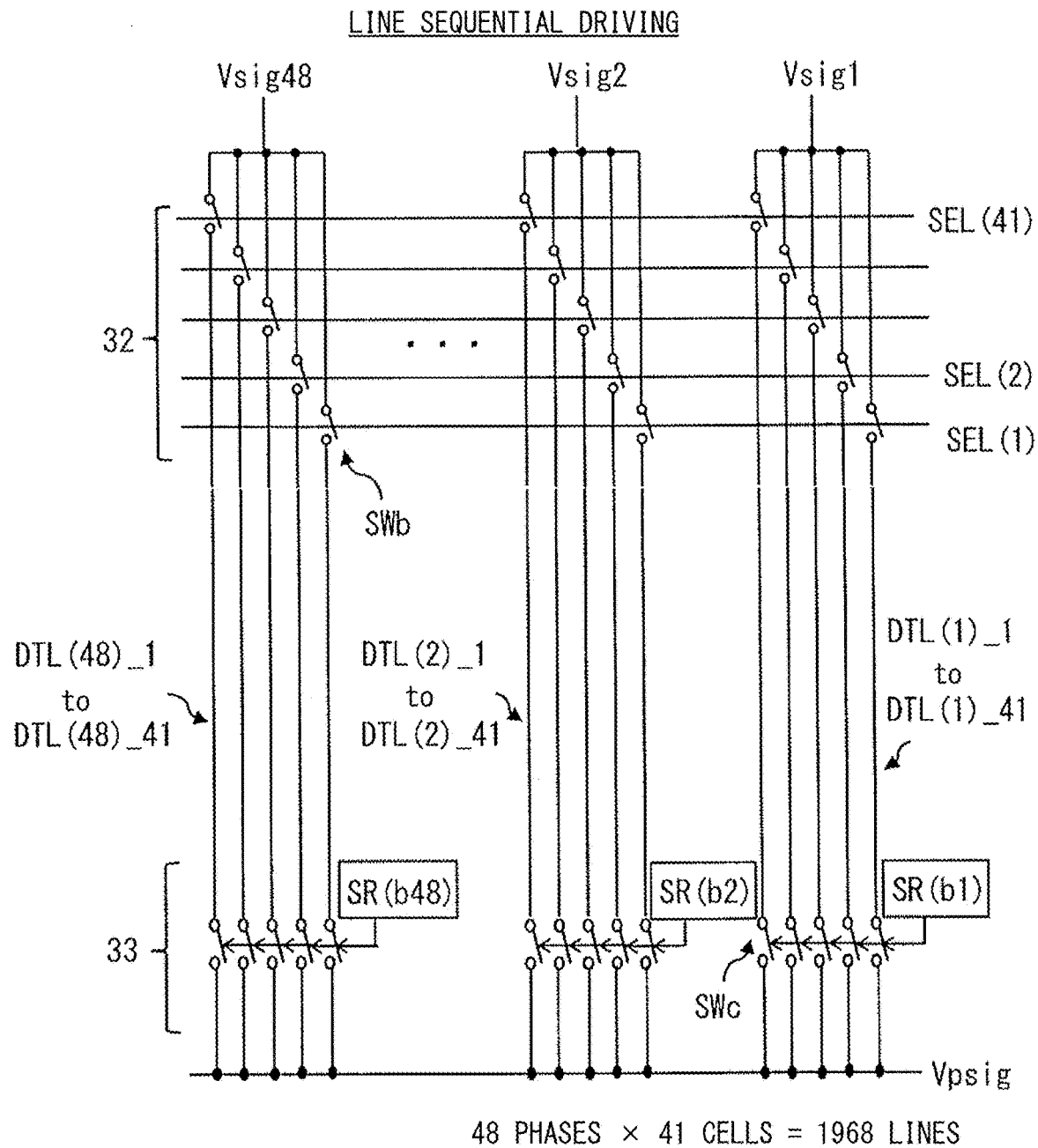

[FIG. 8]
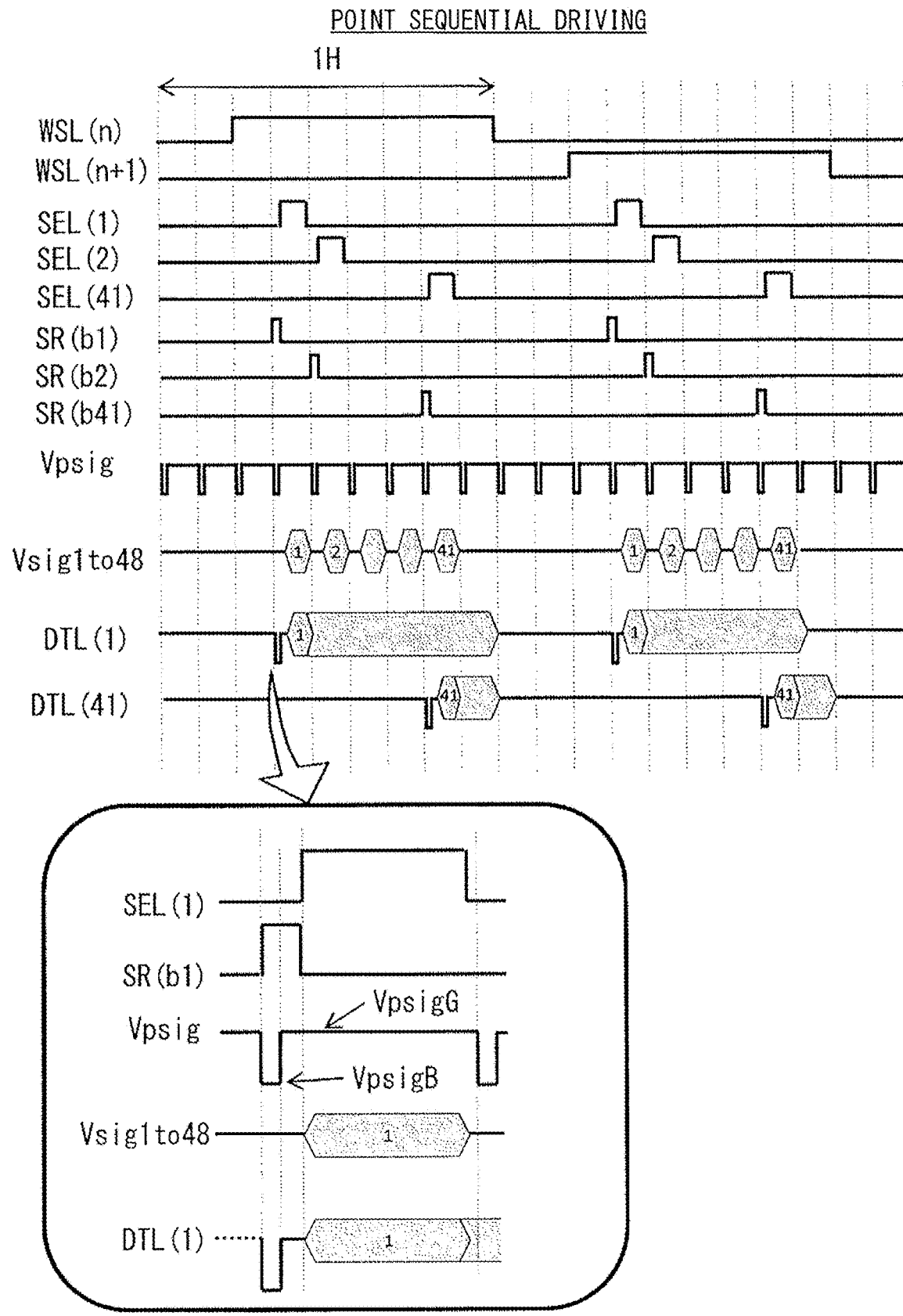

[ FIG. 9A ]
1F-INVERSION DRIVING
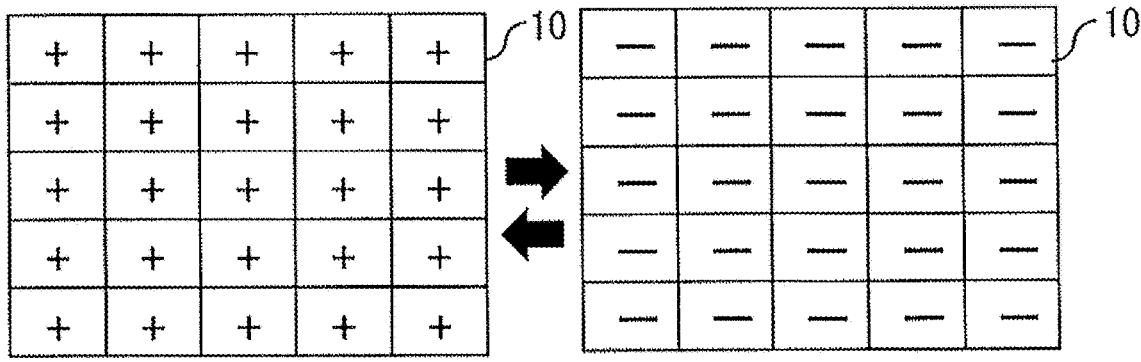
[ FIG. 9B ]
1F1H-INVERSION DRIVING
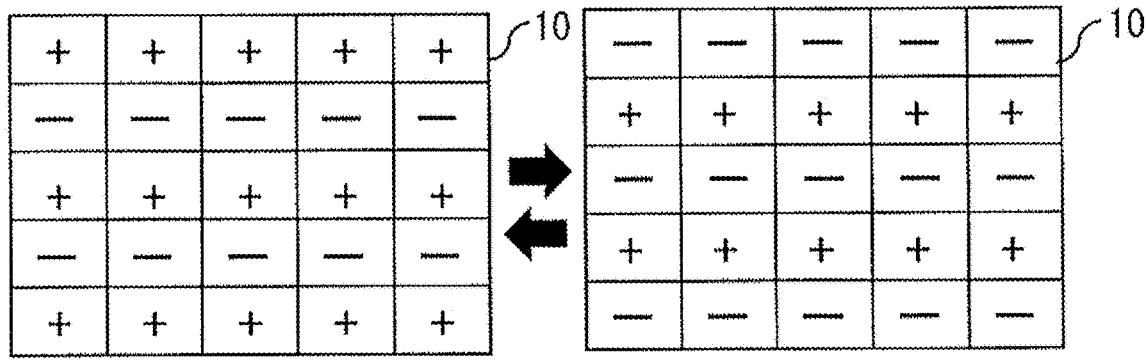
[ FIG. 9C ]
1F-DOT INVERSION DRIVING
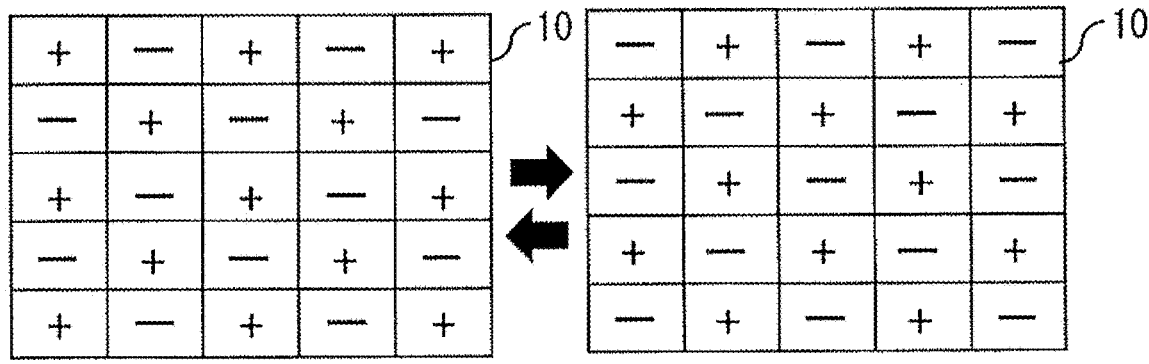

[ FIG. 10 ]
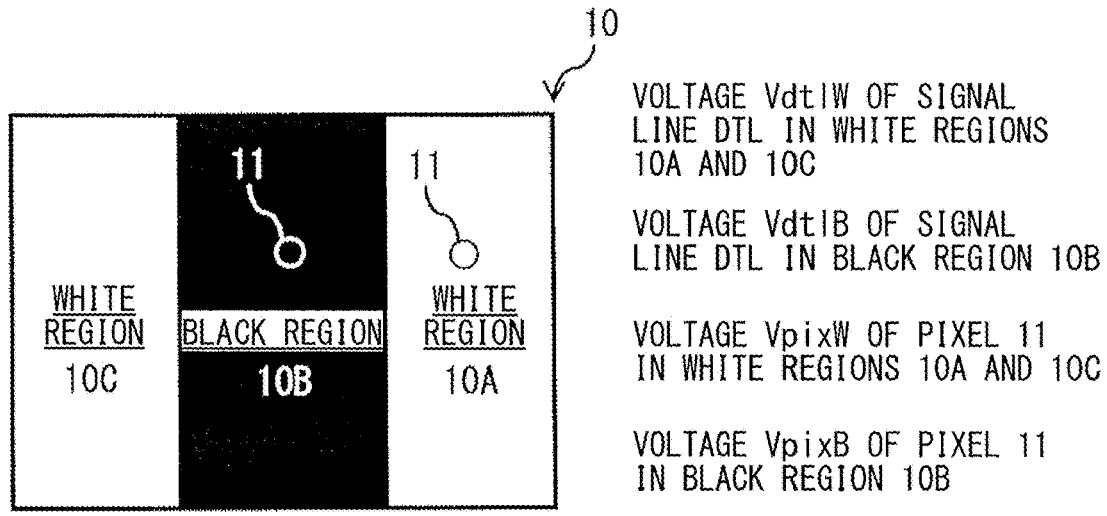
VOLTAGE VdtlW OF SIGNAL LINE DTL IN WHITE REGIONS 10A AND 10C
VOLTAGE VdtlB OF SIGNAL LINE DTL IN BLACK REGION 10B
VOLTAGE VpixW OF PIXEL 11 IN WHITE REGIONS 10A AND 10C
VOLTAGE VpixB OF PIXEL 11 IN BLACK REGION 10B
[ FIG. 11 ]
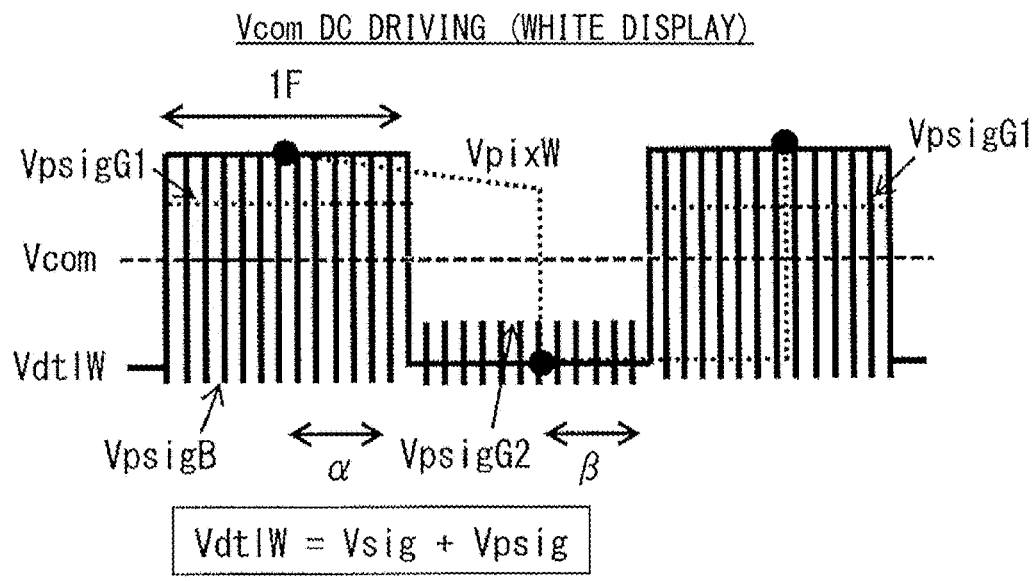
[ FIG. 12 ]
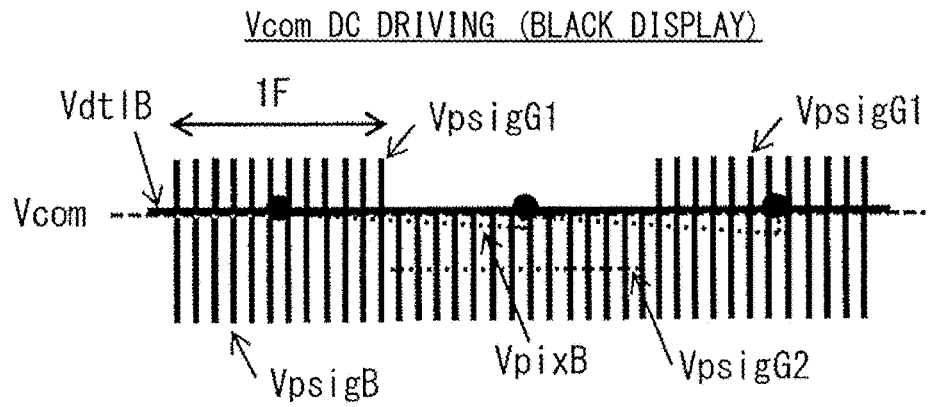

[ FIG. 13 ]
INTERVAL α
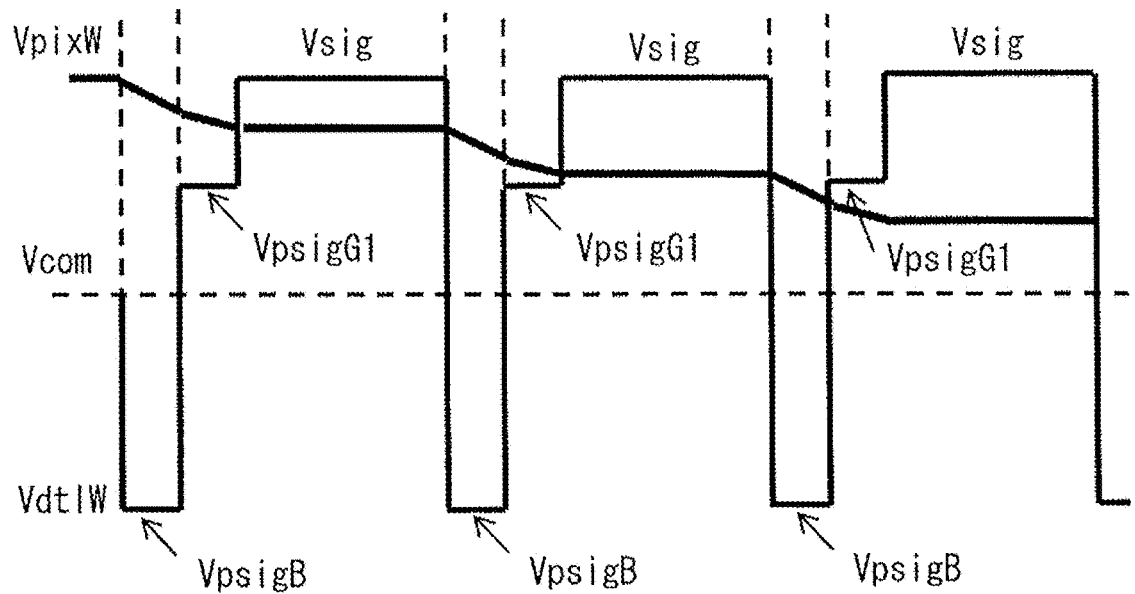
[ FIG. 14 ]
INTERVAL β
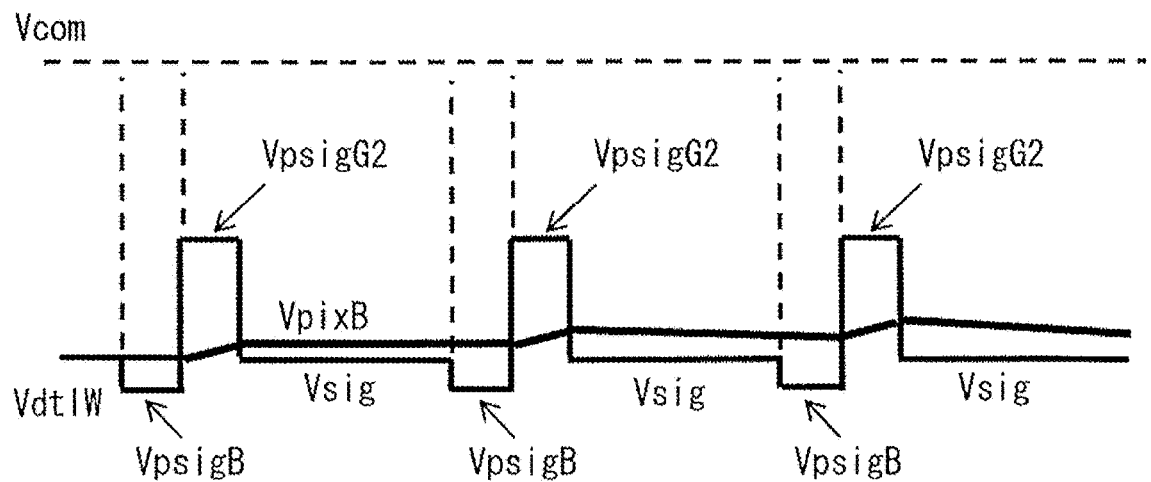

[ FIG. 15 ]
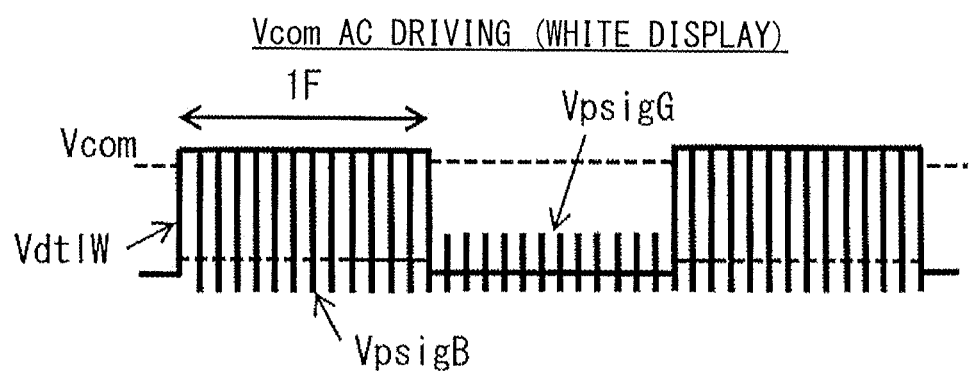
[ FIG. 16 ]
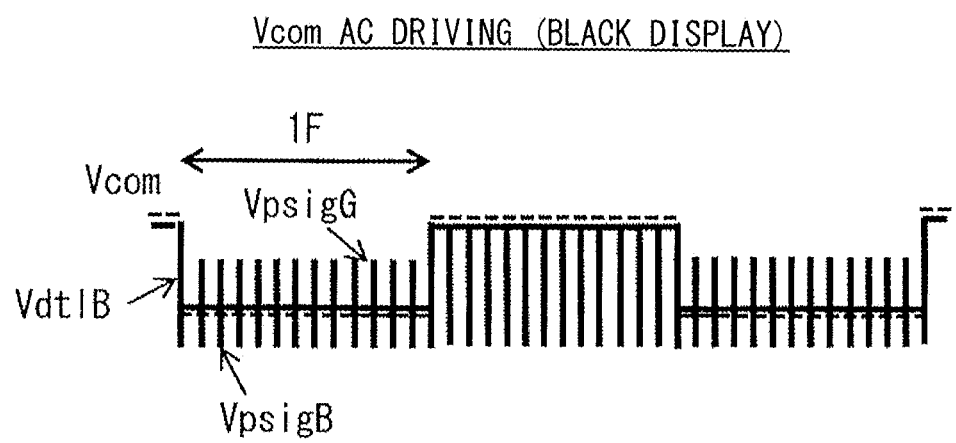

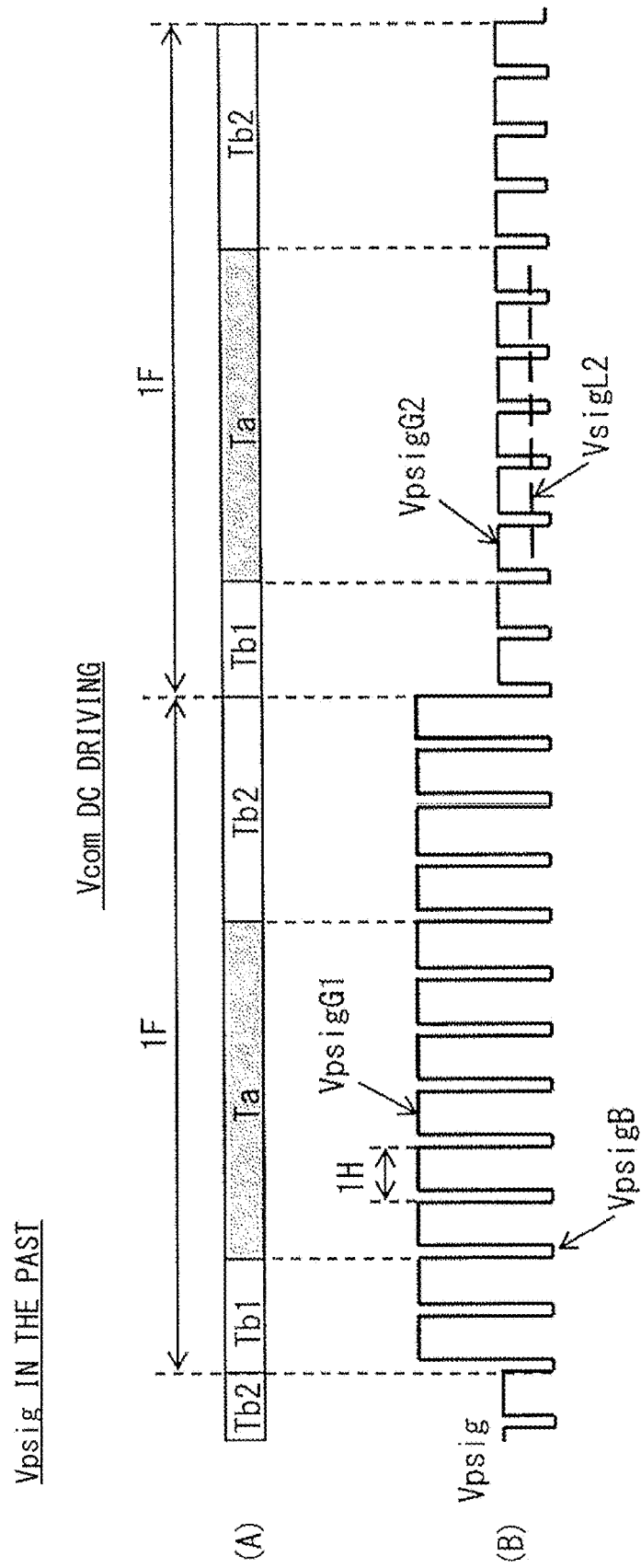
[FIG. 17]

[ FIG. 18 ]
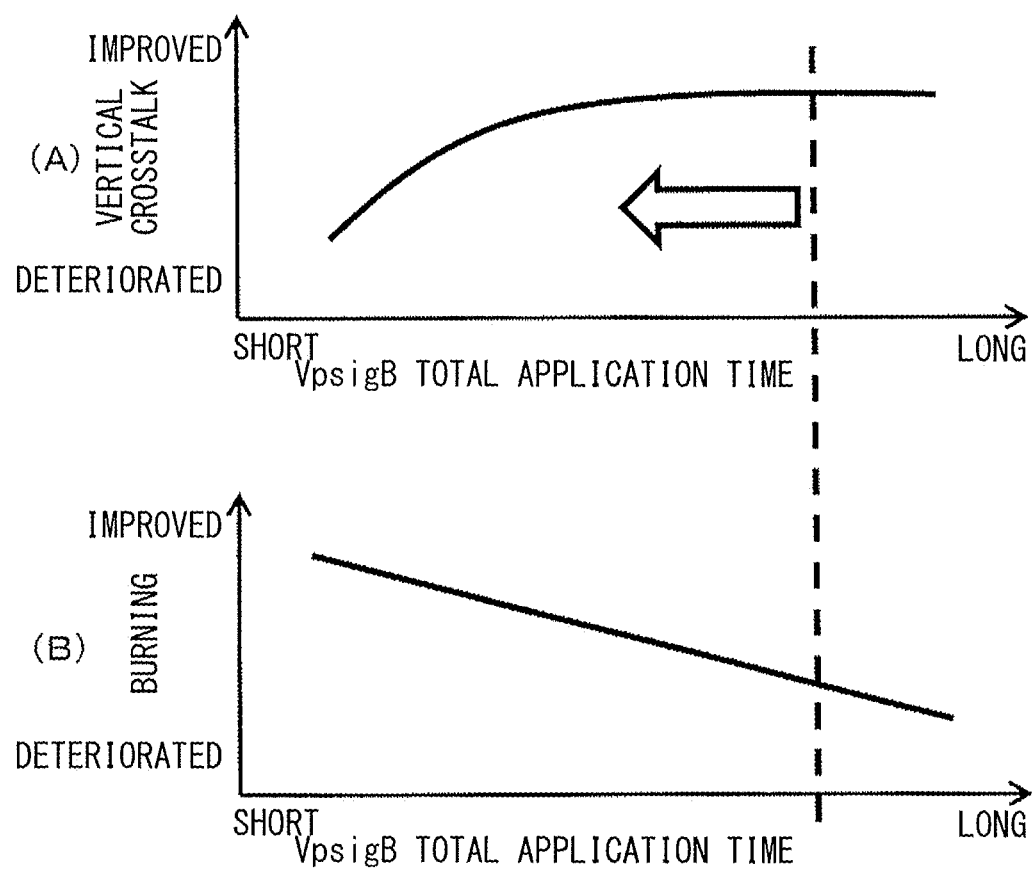

[FIG. 19]
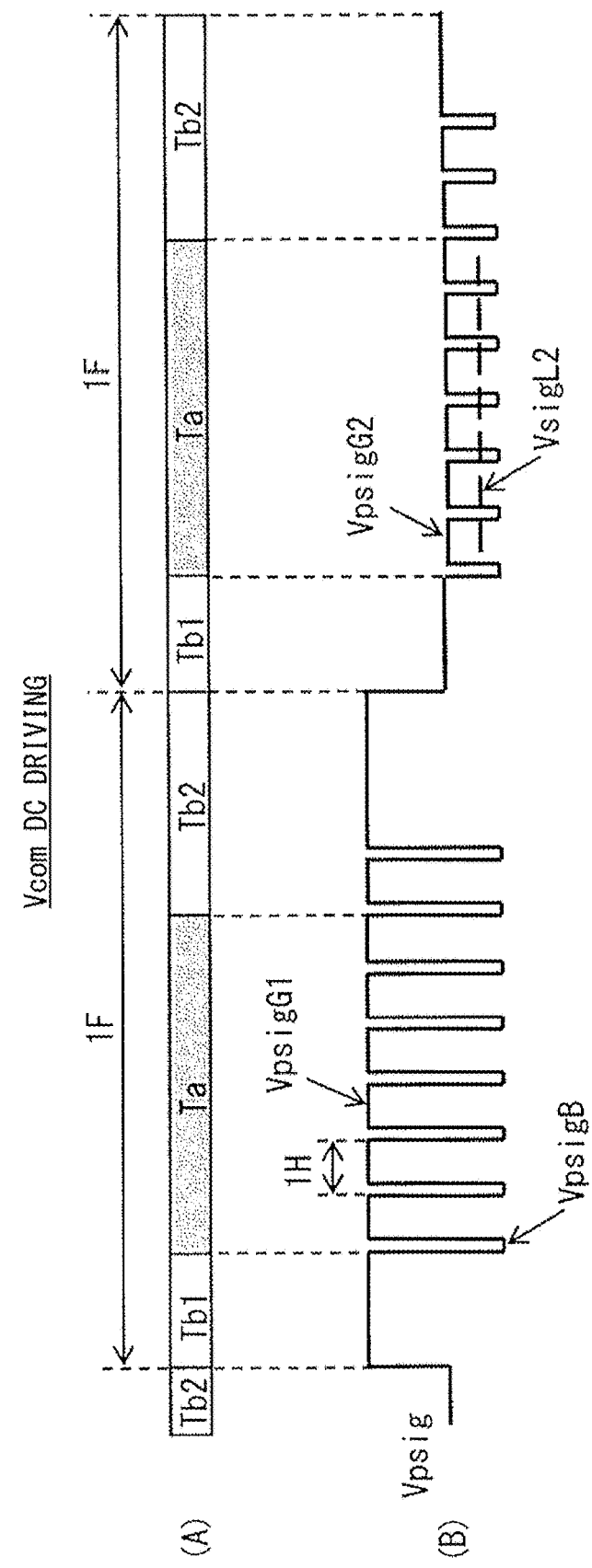

[FIG. 20]
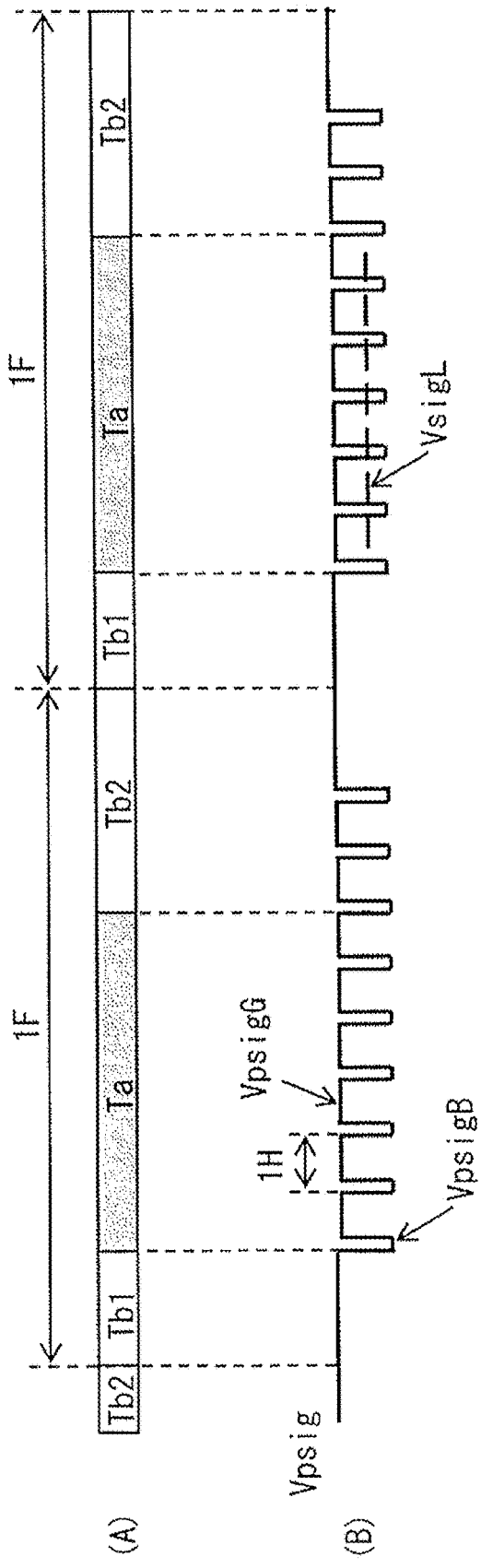

[FIG. 21]
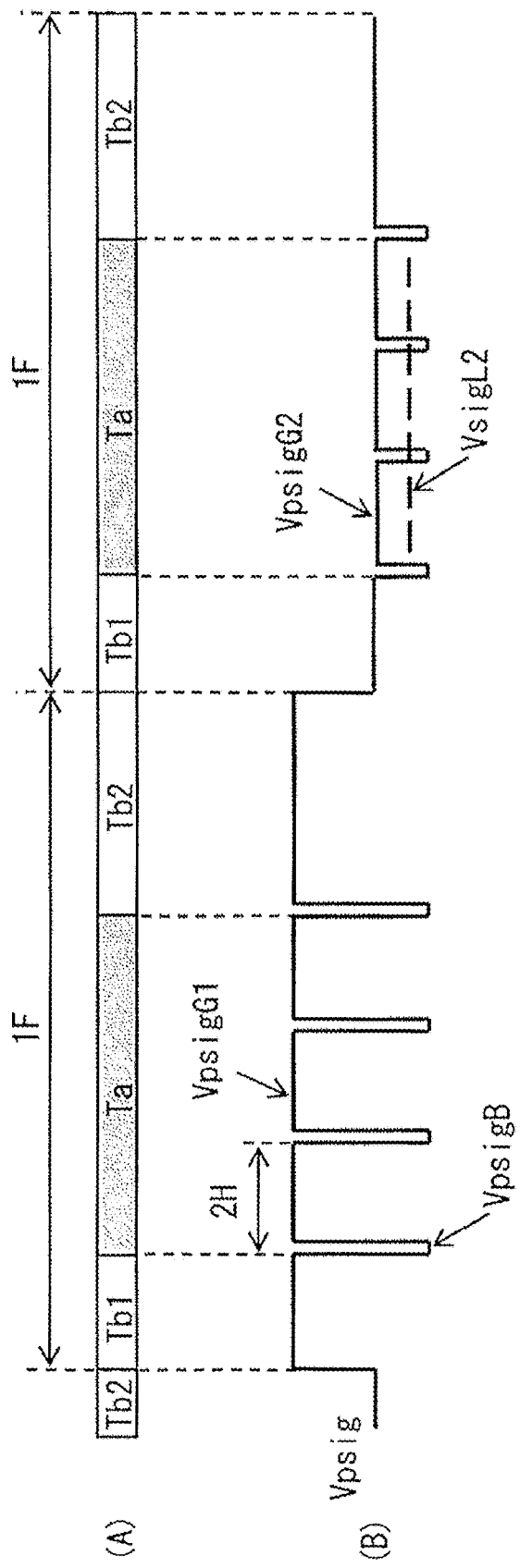

[FIG. 22]
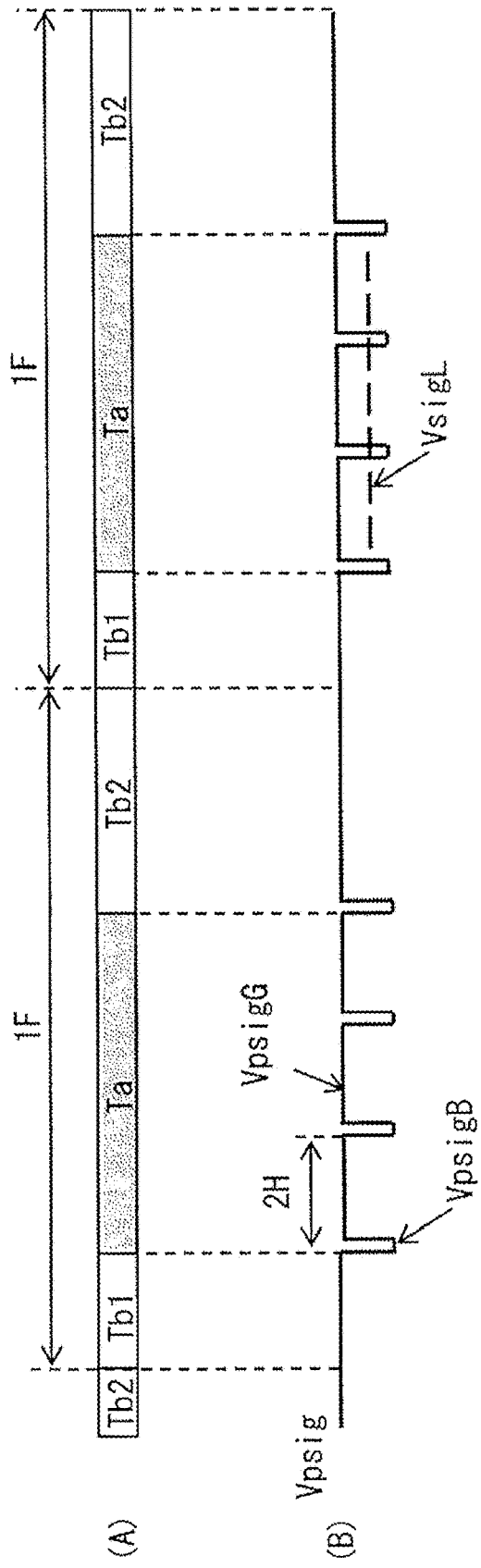

[ FIG. 23 ]
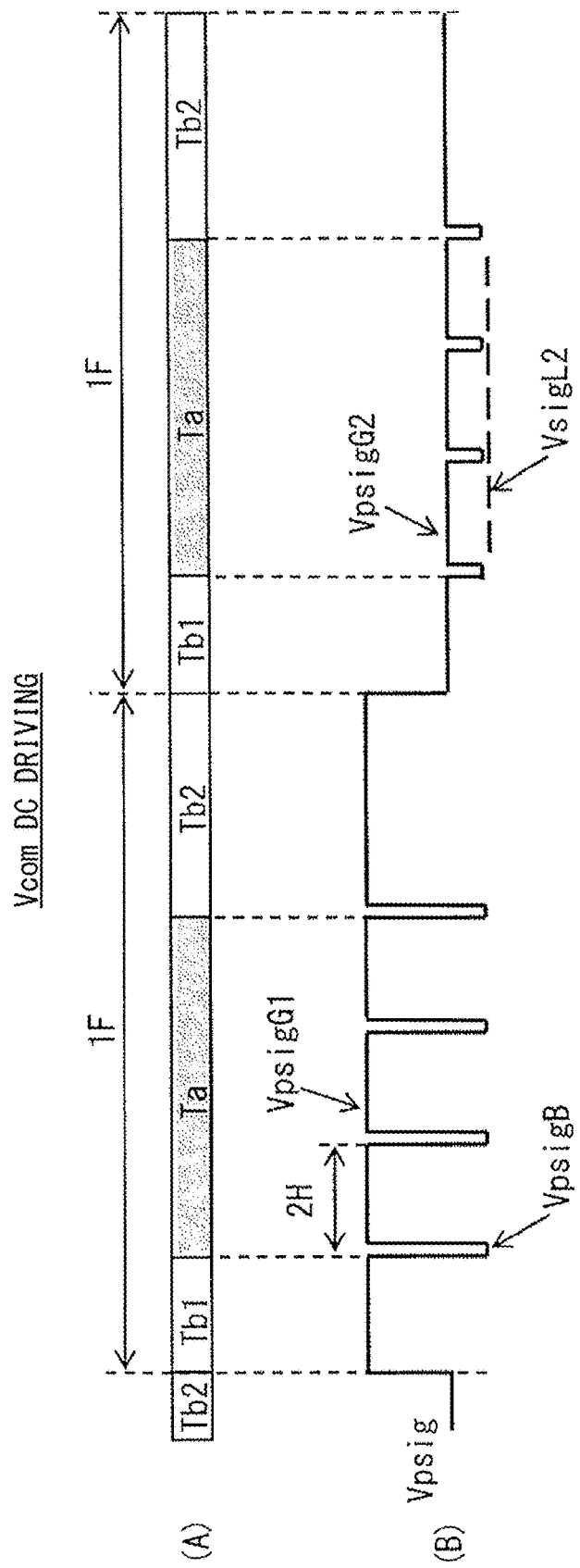

[FIG. 24]
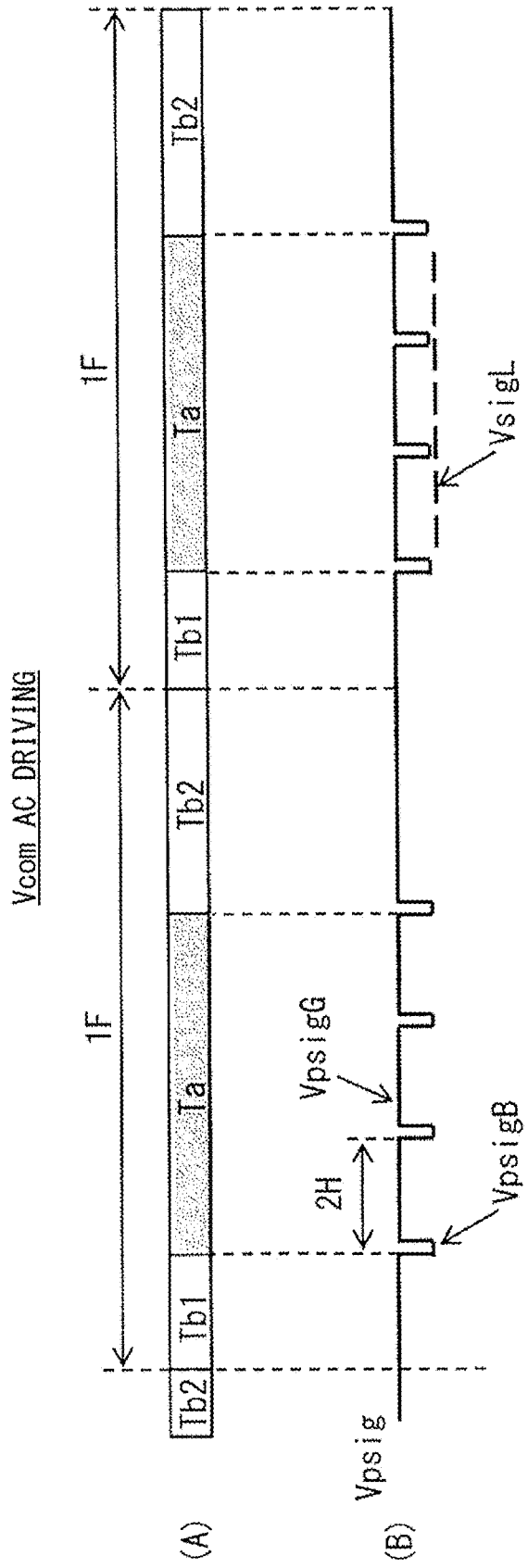

[FIG. 25]
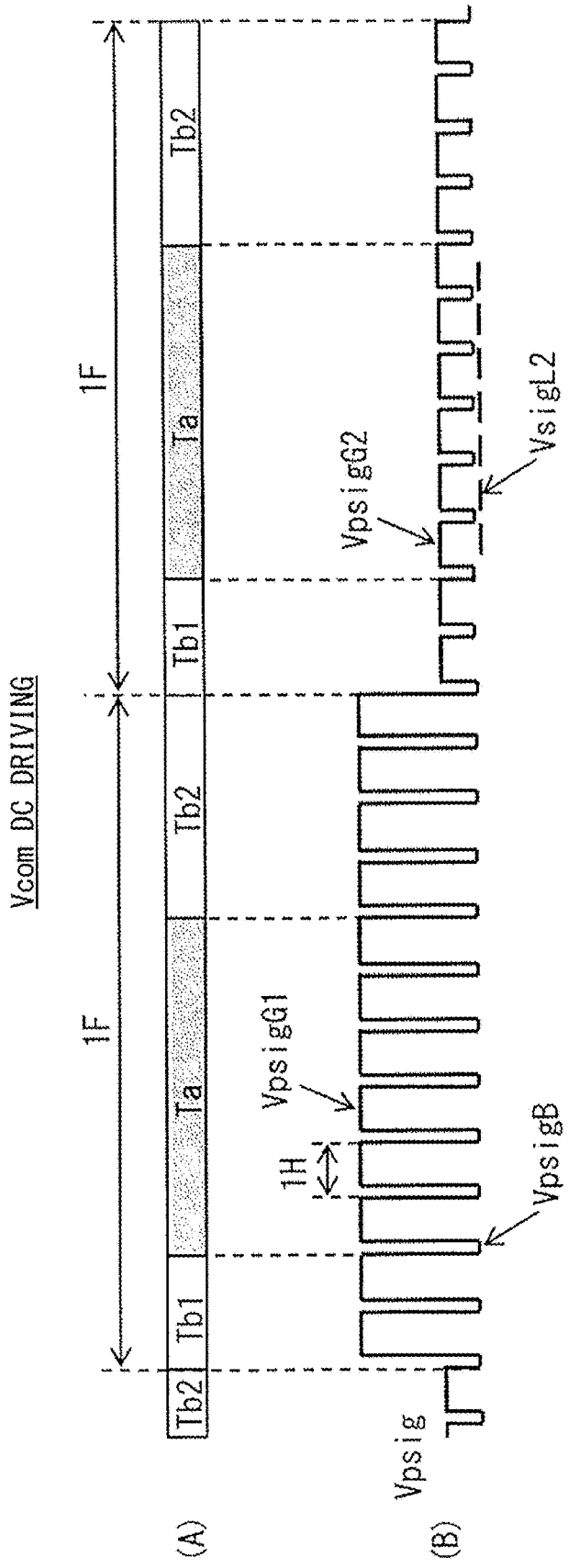

[FIG. 26]
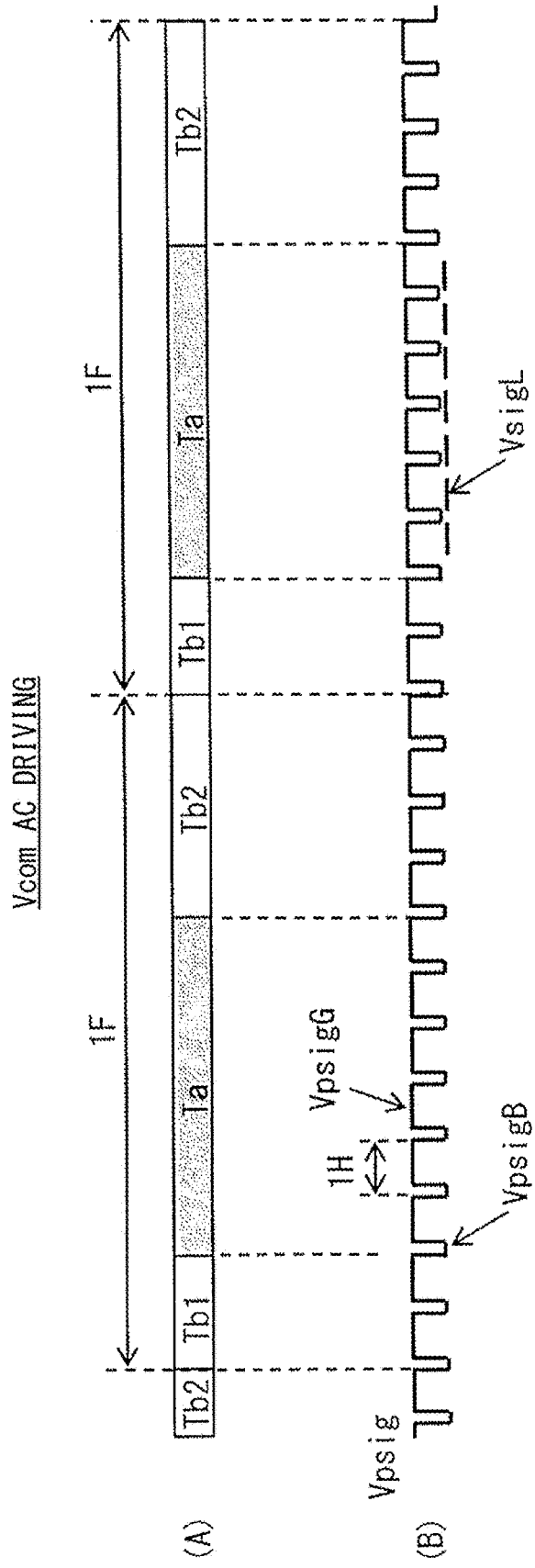

[FIG. 27]
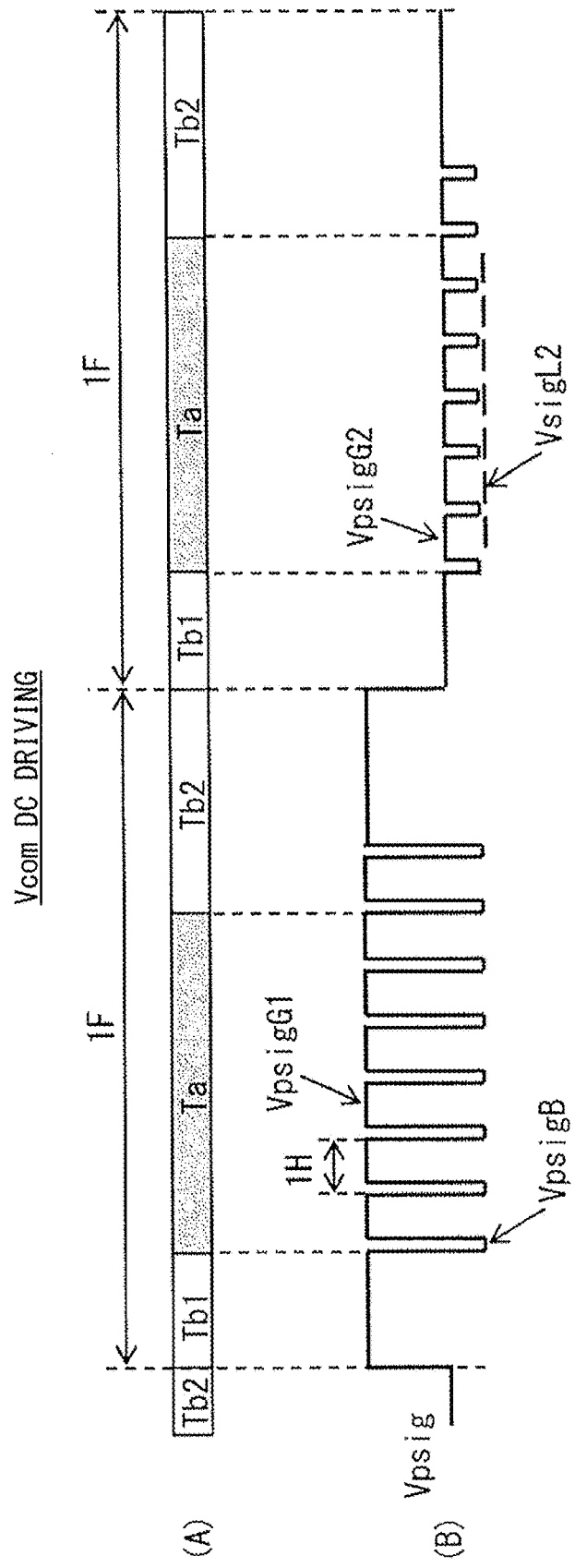

[FIG. 28]
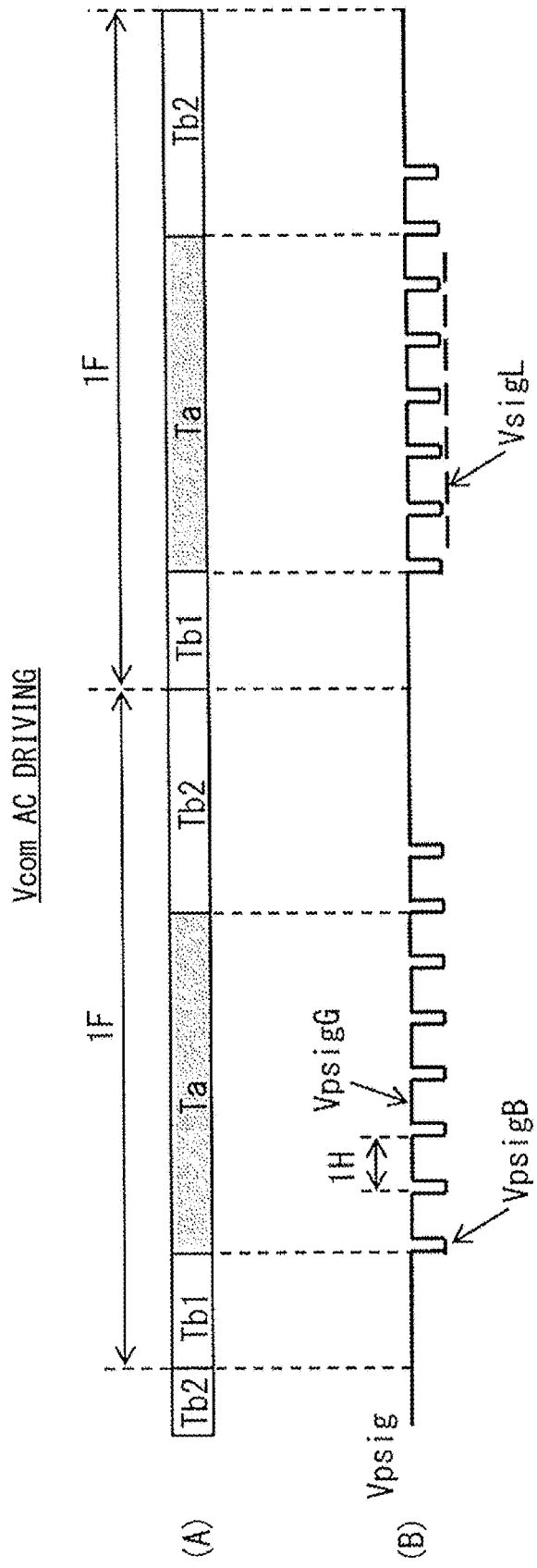

[FIG. 29]
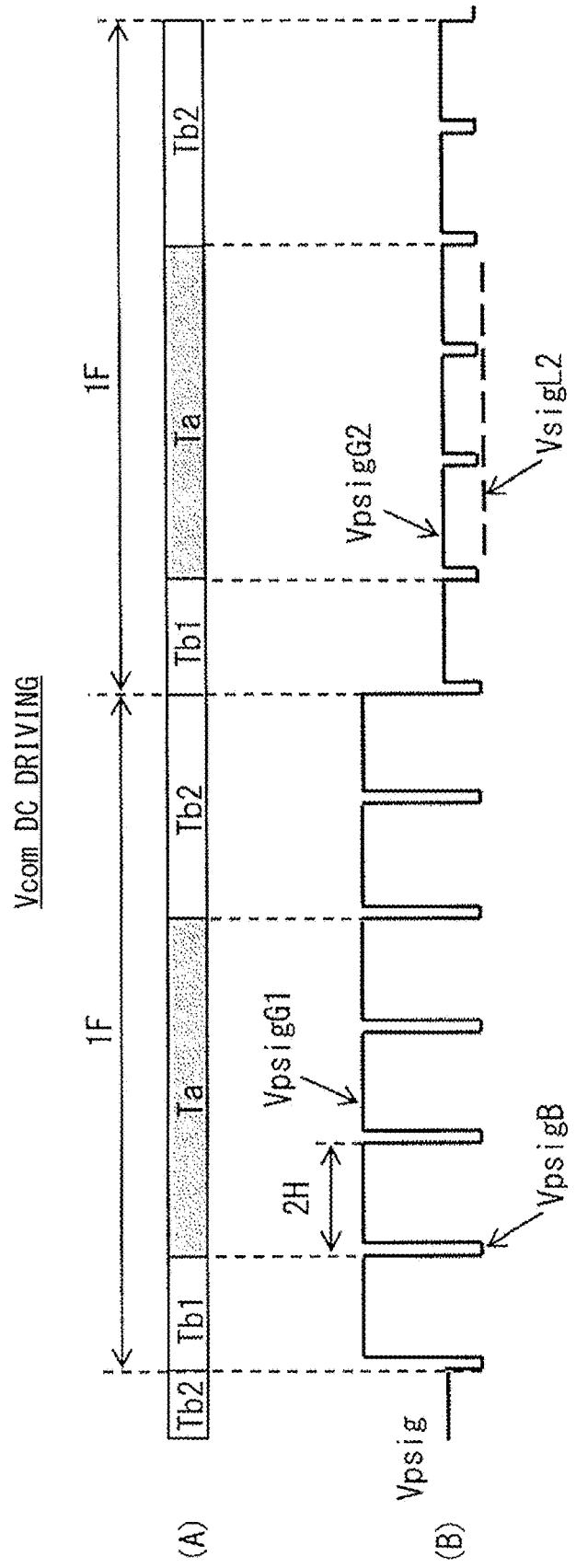

[FIG. 30]
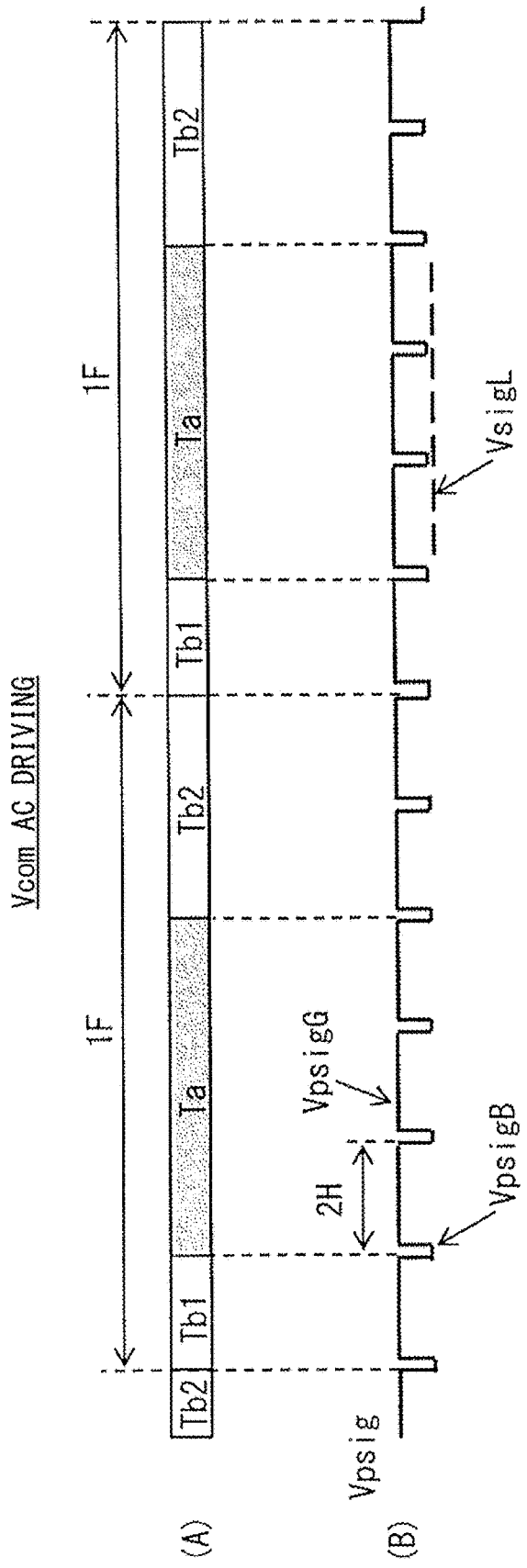

[ FIG. 31 ]
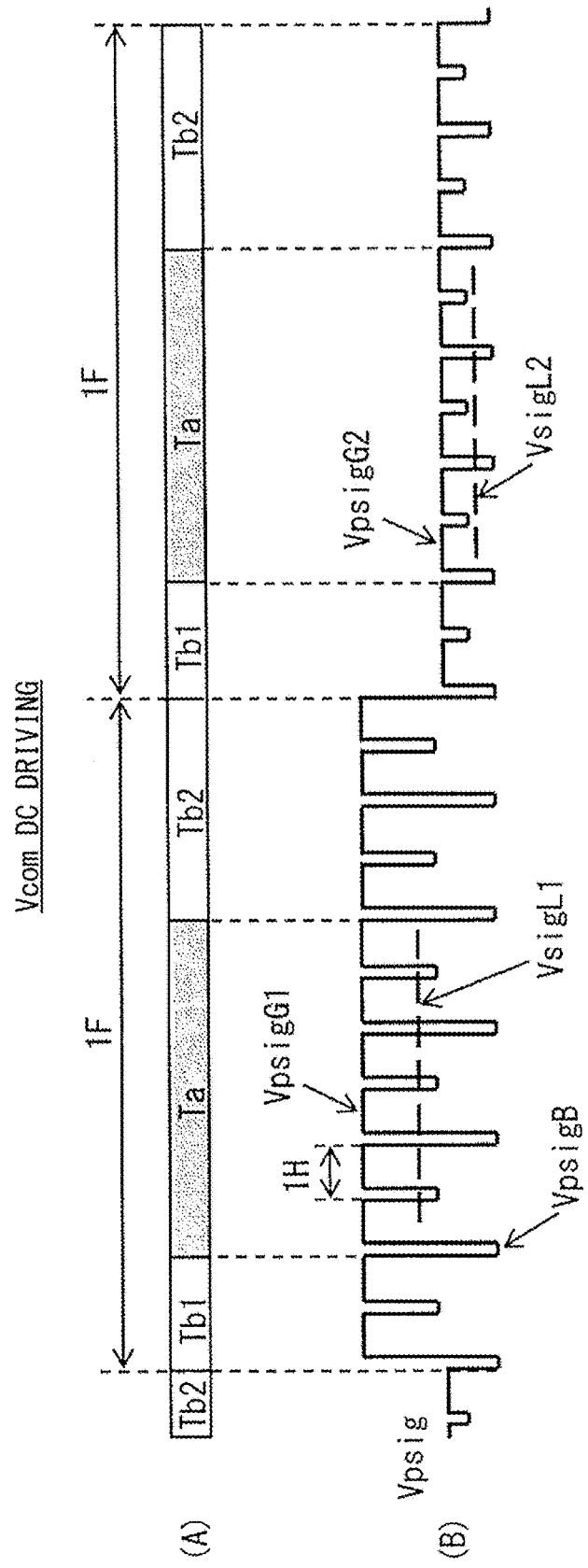

[FIG. 32]
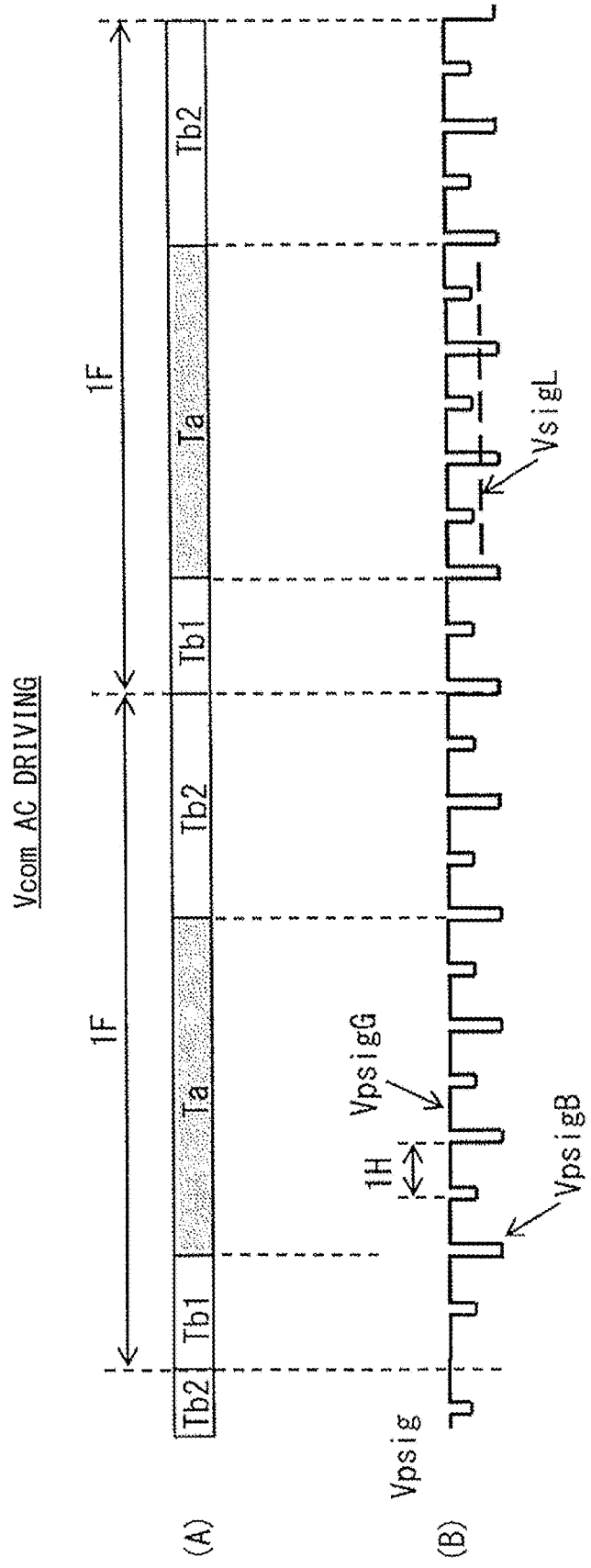

[FIG. 33]
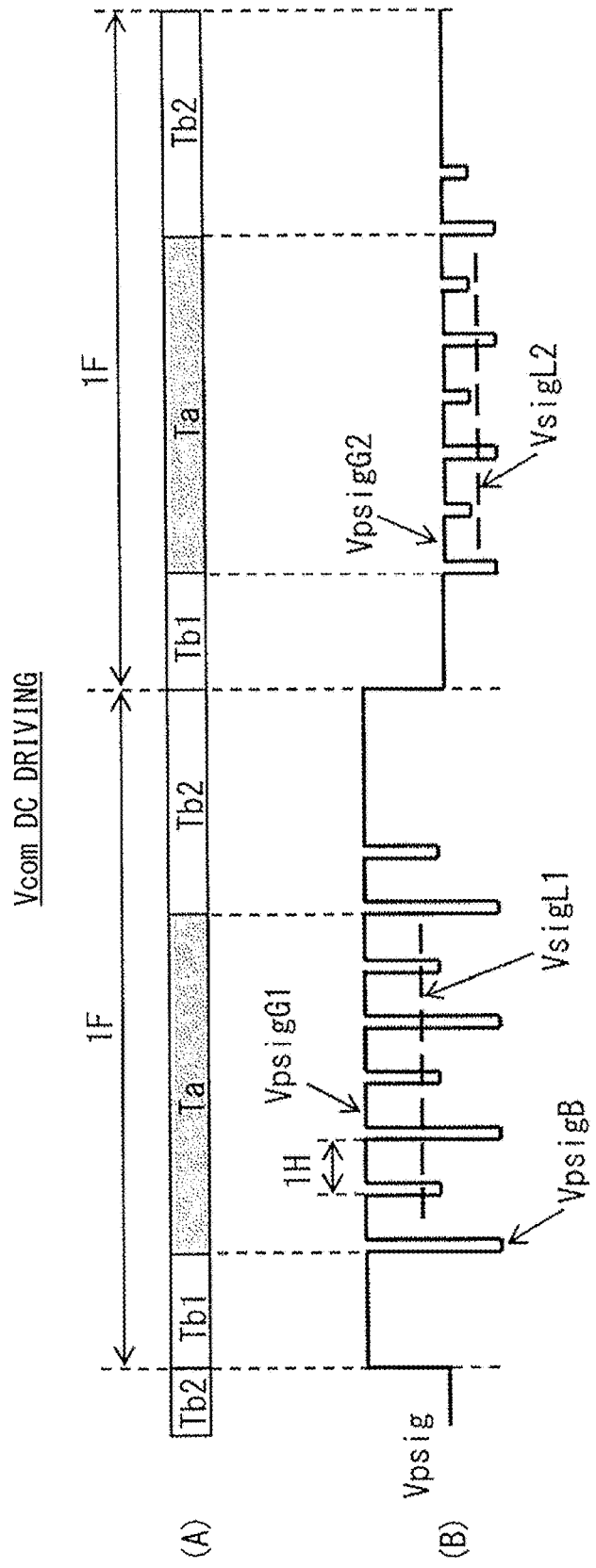

[FIG. 34]
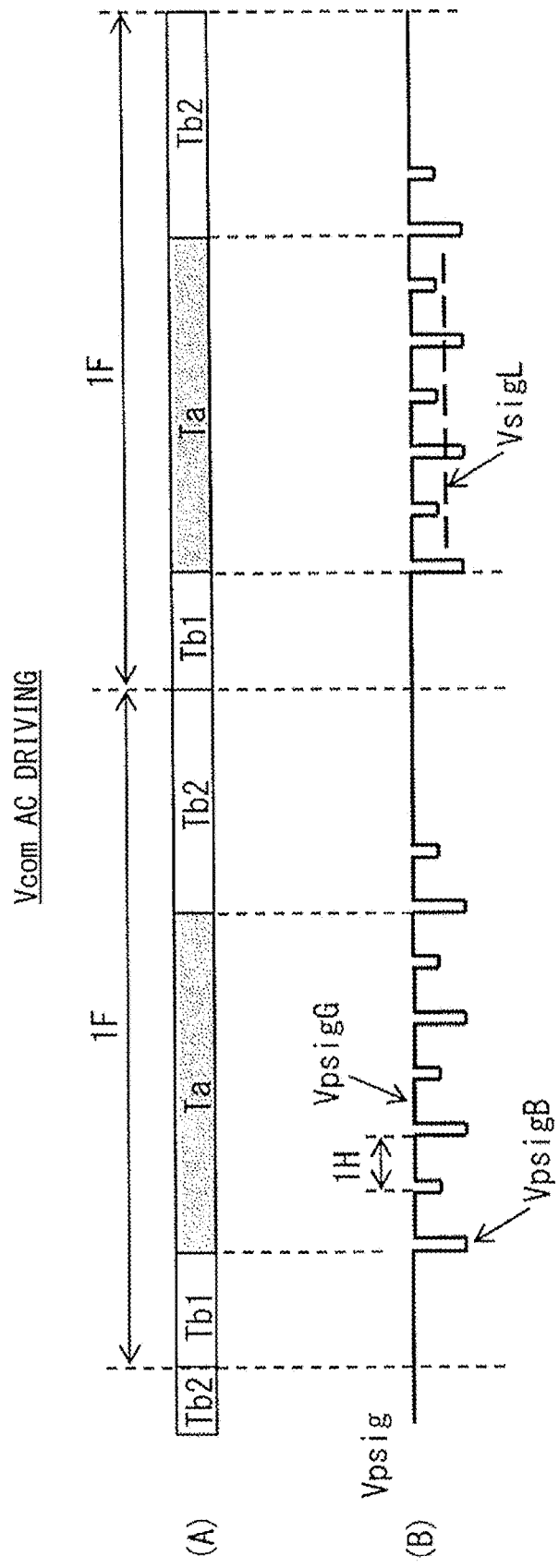

[ FIG. 35 ]
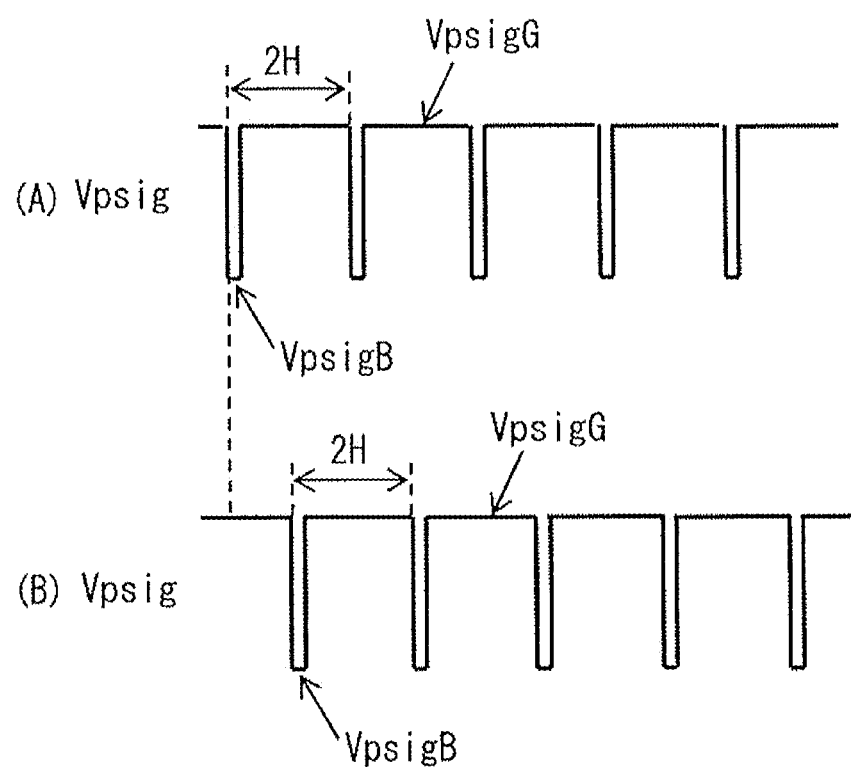

[ FIG. 36 ]
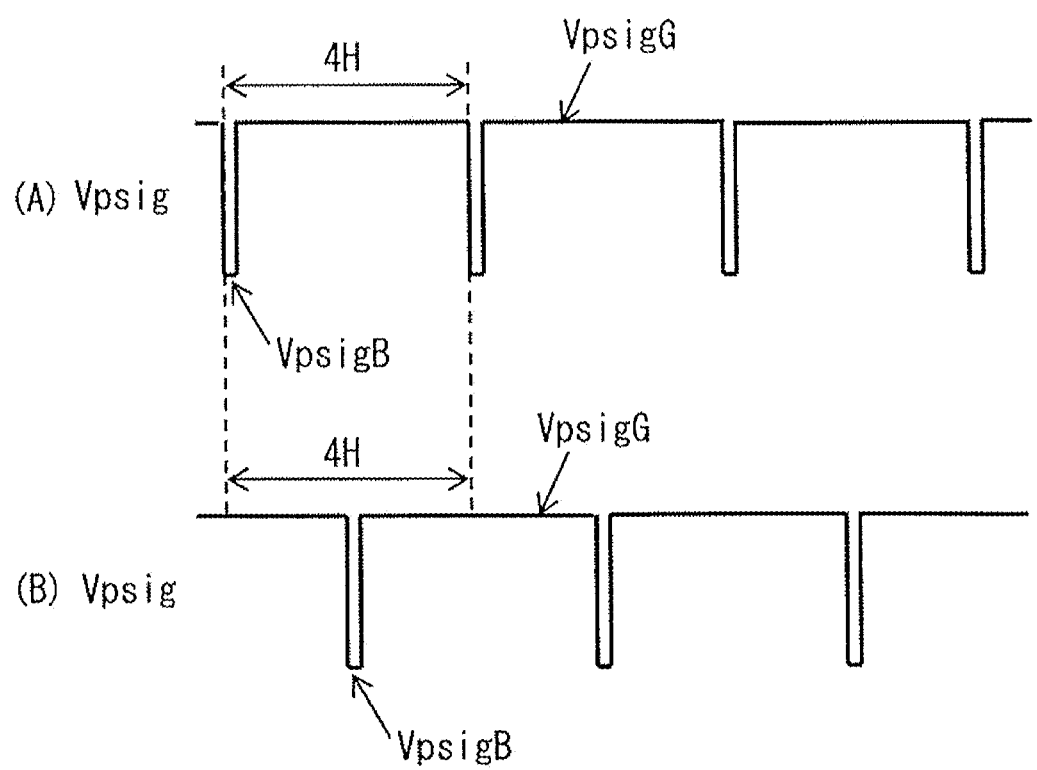

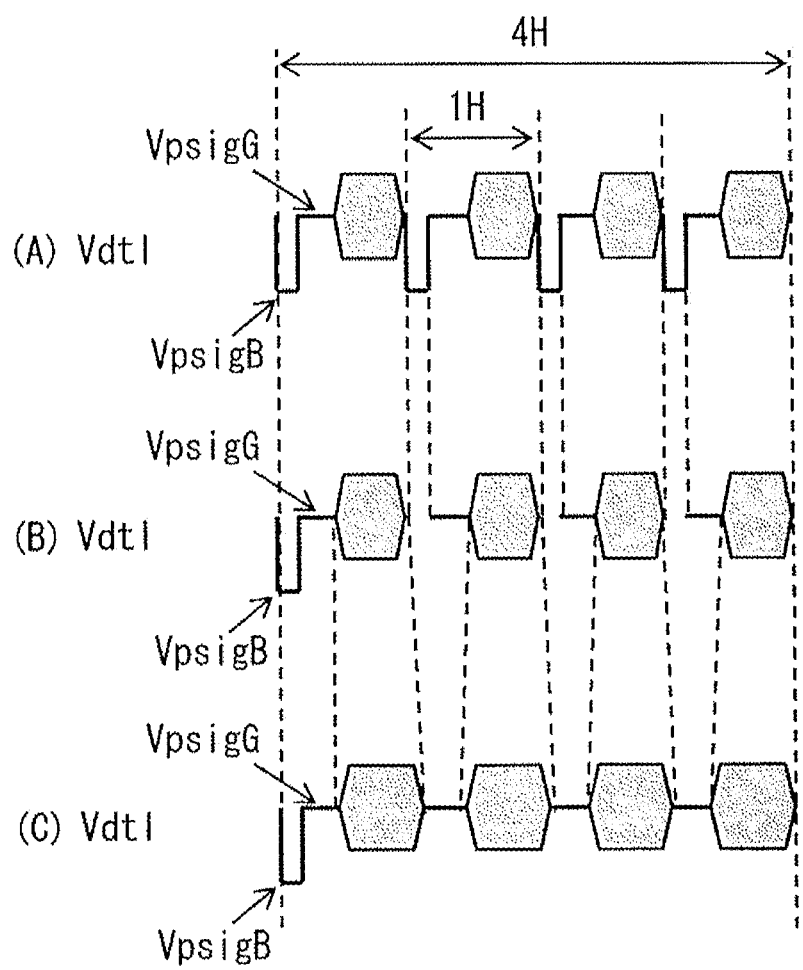
[FIG. 37]

[ FIG. 38 ]
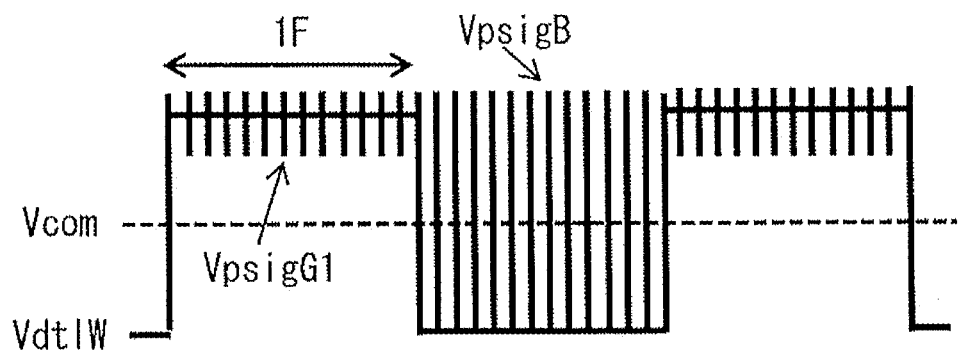
[ FIG. 39 ]
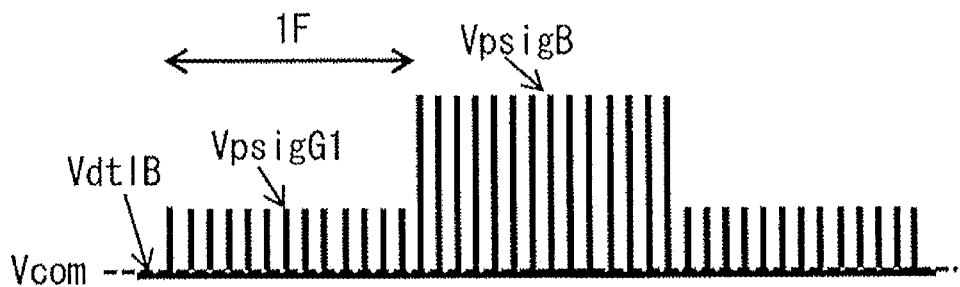

[ FIG. 40 ]
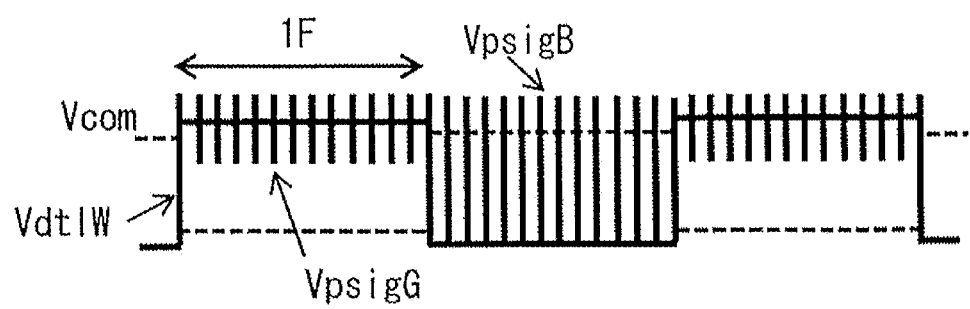
[ FIG. 41 ]
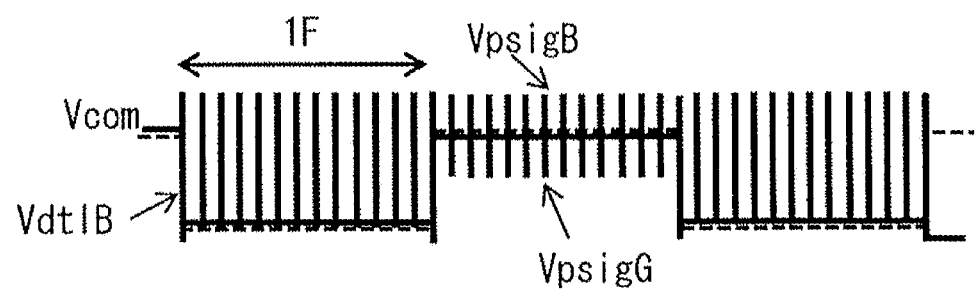

[ FIG. 42 ]
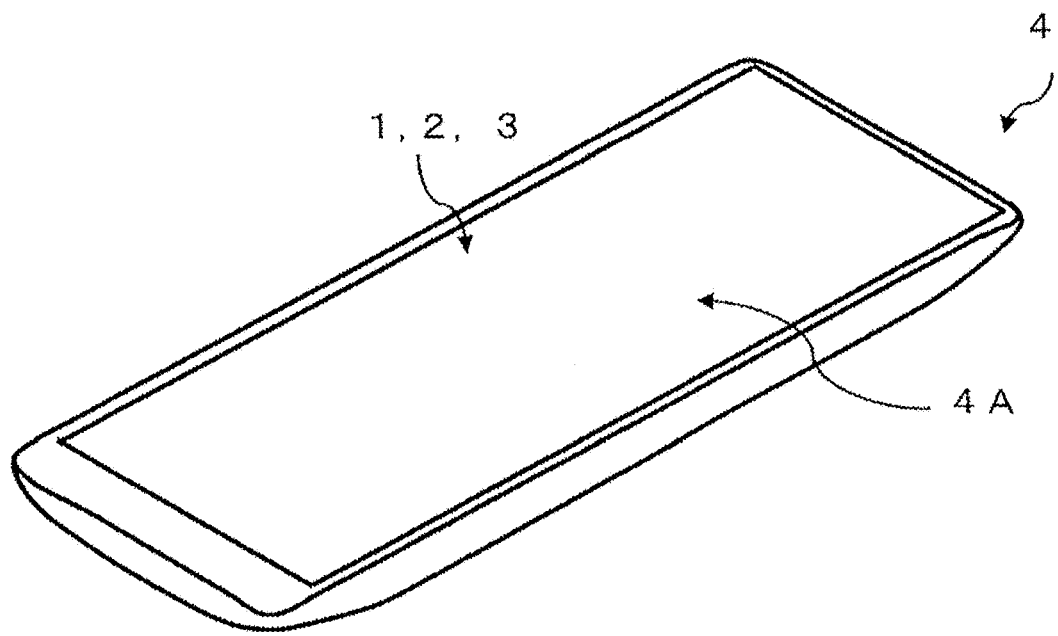
[ FIG. 43 ]
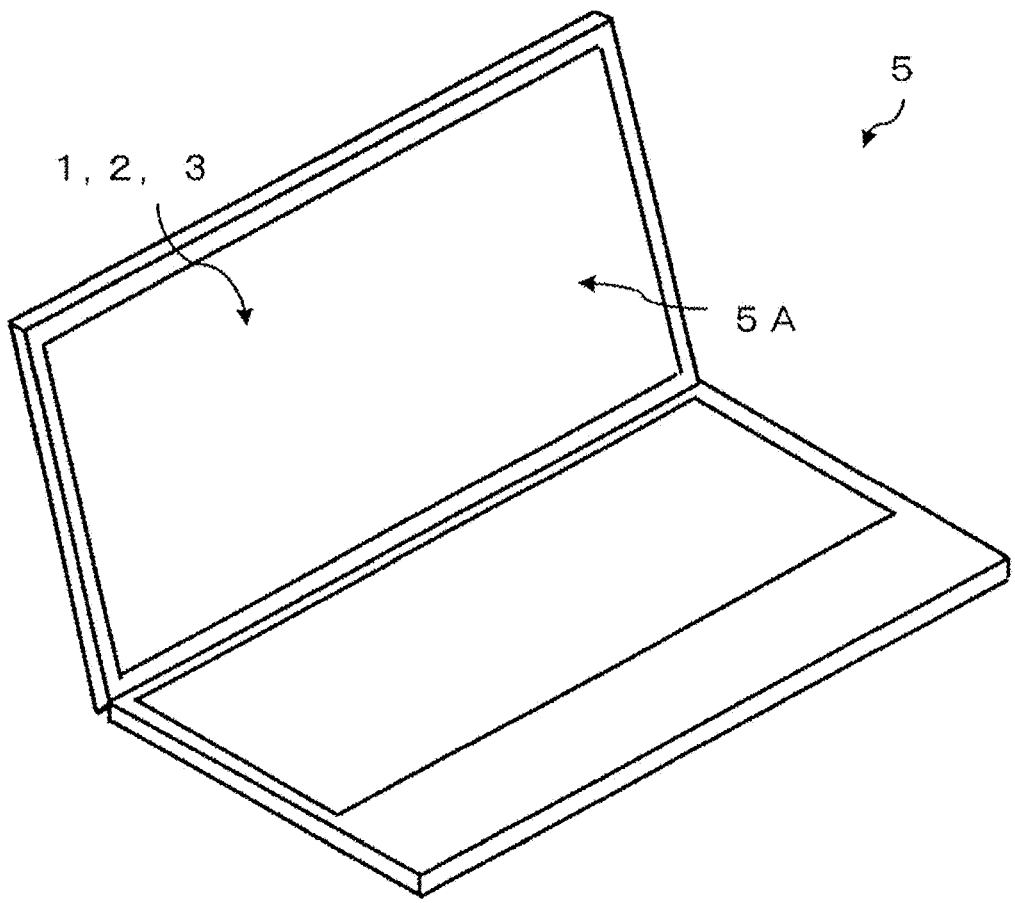

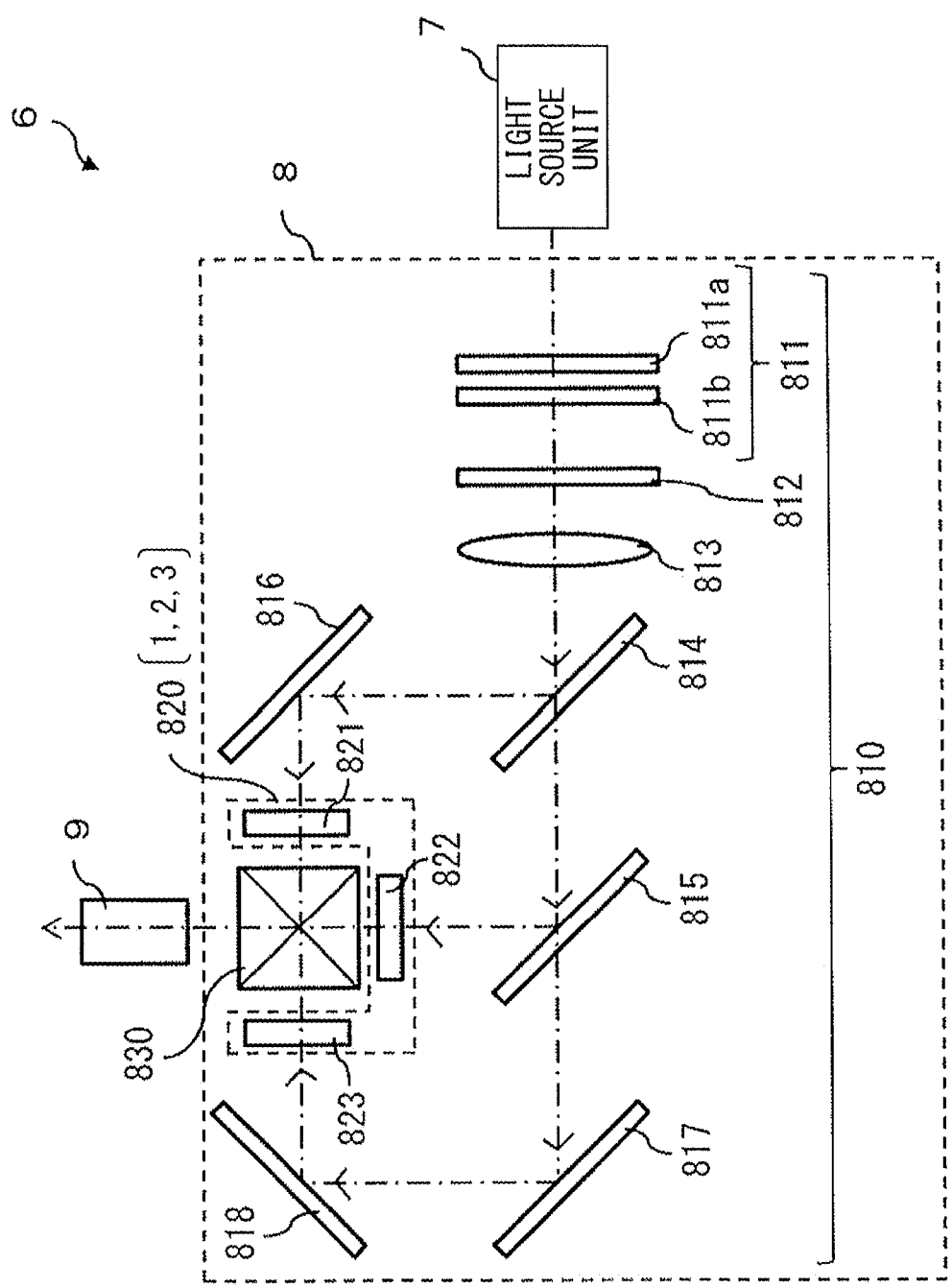
[ FIG. 44 ]

DISPLAY DEVICE, ELECTRONIC APPARATUS, AND PROJECTION DISPLAY APPARATUS

CROSS-REFERENCE TO RELATED APPLICATIONS

This application claims the benefit under 35 U.S.C. § 371 as a U.S. National Stage Entry of International Application No. PCT/JP2016/088925, filed in the Japanese Patent Office as a Receiving Office on Dec. 27, 2016, which claims priority to Japanese Patent Application Number JP2016-017869, filed in the Japanese Patent Office on Feb. 2, 2016, each of which is hereby incorporated by reference in its entirety.

TECHNICAL FIELD

The disclosure relates to a display device, an electronic apparatus, and a projection display apparatus.

BACKGROUND ART

In a display device including a liquid crystal cell as an electrooptical element, when a DC voltage is continuously applied to the liquid crystal cell for a long time, deterioration of resistivity (a resistance value inherent to a substance) of the liquid crystal, etc., or an afterimage phenomenon called "burning" occurs. Therefore, an AC driving method is adopted which inverts, at a predetermined period, a polarity of a signal voltage applied to a pixel electrode of the liquid crystal cell with respect to an electric potential of a counter electrode of the liquid crystal cell.

As an example of the AC driving method, a 1F inversion driving method is known which, while making constant a common voltage applied to the counter electrode, inverts the polarity of the signal voltage for each 1-field period (1F) or inverts not only the polarity of the signal voltage but also the polarity of the common voltage for each 1F. Besides this, a 1F1H-inversion driving method is known, for example, which, while making the common voltage constant, inverts the polarity of the signal voltage for each 1F as well as for each 1-horizontal period (1H) or inverts not only the polarity of the signal voltage but also the polarity of the common voltage for each 1F as well as for each 1H. Further, a 1F1-dot inversion driving method is known, for example, which, while making the common voltage constant, inverts the polarity of the signal voltage for each 1F as well as for each 1-dot or inverts not only the polarity of the signal voltage but also the polarity of the common voltage for each 1F as well as for each 1-dot.

In the AC driving method, however, large charging-discharging electric current due to writing of an image signal in a signal line causes fluctuations of an electric potential in the signal line. As a result, the fluctuations of the electric potential in the signal line are seen on a display screen as a vertical streak, leading to deterioration of uniformity (uniformity of screen). In order to improve the uniformity, it is important to suppress the above-described charging-discharging electric current as low as possible. Therefore, a precharge system is adopted which writes in the signal line in advance in a horizontal blanking period, a precharge signal voltage of a half tone level such as a gray level, prior to the writing of the image signal in the signal line.

However, setting the precharge signal voltage level to the half tone level causes a leakage current to flow between a source and a drain of a TFT (Thin Film Transistor; thin film transistor) used as a pixel transistor. The amount of the leak of the electric current varies depending on the size of an electric potential between the source and the drain. Therefore, for example, in a case where, in a liquid crystal display device of normally white, the precharge signal voltage level is set to the gray level to display a black window pattern, the amounts of the leak of the electric current between the black region and the gray region of the window pattern differ from each other. This causes information of black of the window pattern to leak to the signal line through the pixel transistor, which then generates crosstalk in a vertical direction (perpendicular direction) (hereinafter, referred to as "vertical crosstalk"), leading to deterioration of image quality.

In order to reduce the vertical crosstalk in the liquid crystal display device of normally white, the precharge signal voltage level may be set to black level. This is because writing the black level as the precharge signal voltage in advance in the signal line makes it possible to make constant the electric potential between the source and the drain of the pixel transistor in a whole pixel region, and to make the amount of the leak of the electric current uniform in the whole pixel region.

As a method to reduce both the vertical crosstalk and the above-described vertical streak, for example, a two-step precharge system is adopted which sequentially applies to the signal line both the black level and the gray level of the precharge signal voltage level in the horizontal blanking period (for example, referred to as PLTs 1 to 3).

CITATION LIST

Patent Literature

PTL1: Japanese Unexamined Patent Application No. 2005-309282
PTL2: Japanese Unexamined Patent Application No. 2008-216425
PTL3: Japanese Unexamined Patent Application No. 2013-156645

SUMMARY OF INVENTION

However, electric current leakage is performed forcibly in a two-step precharge system. Therefore, symmetry between voltage application to a common voltage on a positive electrode side and voltage application to the common voltage on a negative electrode side is collapsed in a 1F period. This causes an electric field in a liquid crystal cell. The electric field then causes charge up in which impurity ions included in the liquid crystal cell are concentrated at an interface of a pixel electrode or a counter electrode. As a result, there has been an issue of occurrence of temporary burning.

Accordingly, it is desirable to provide a display device, an electronic apparatus, and a projection display apparatus that make it possible to suppress occurrence of temporary burning due to precharge.

A display device according to an embodiment of the disclosure includes a pixel array section including a plurality of pixels that are disposed two-dimensionally in a matrix, and a signal line that is disposed for each pixel column. A first display device further includes a first driver that sequentially selects each of pixels on a row basis, and a second driver that applies through the signal line an image signal to each of the pixels in a pixel row that is selected by the first driver, and that inverts a polarity of the image signal at a predetermined period. The second driver sequentially applies, to the signal line, a first precharge signal voltage having a relatively large amplitude and a second precharge signal voltage having a relatively small amplitude, prior to the application of the image signal. The second driver further controls the application of the first precharge signal voltage to cause an amount of leak of an electric current from the pixel to the signal line due to the application of the first precharge signal voltage to become smaller than that in another period for each of predetermined horizontal periods.

In the display device of the embodiment of the disclosure, the second driver may perform the application of the second precharge signal voltage for each 1-horizontal period while the second driver may thin the application of the first precharge signal voltage for each of the predetermined horizontal periods. At this time, the second driver, for example, may omit the application of the first precharge signal voltage in a whole or a portion of a horizontal period that includes no application period of each of the image signals. Further, the second driver may uniformly assign, to the application period of each of the image signals, a whole or a portion of a time generated as a result of the thinning of the first precharge signal voltage. Further, the first precharge signal voltage may be a voltage value of a lowest level of the image signal or may be a voltage value of a level larger than the lowest level thereof.

Further, in the display device of the embodiment of the disclosure, the second driver may perform the application of the first precharge signal voltage and the application of the second precharge signal voltage for each 1-horizontal period, and may make an amplitude of the first precharge signal voltage smaller than an amplitude of the first precharge signal voltage in another horizontal period, for each of the predetermined horizontal periods.

An electronic apparatus of an embodiment of the disclosure is provided with the above-described display device.

A projection display device of an embodiment of the disclosure includes an illumination optical system, a plurality of image light generators, and a projection optical system. The plurality of image light generators modulates light from the illumination optical system to thereby generate pieces of image light, and the projection optical system projects each of the pieces of image light that is generated at the plurality of image light generators. Each of the image light generators includes the same components as those of the above-described display device.

In the display device of the embodiment of the disclosure, the electronic apparatus of the disclosure, and the projection display device of the disclosure, the application of the first precharge signal voltage is controlled to cause the amount of leak of the electric current from the pixel to the signal line due to the application of the first precharge signal voltage to become smaller than that in the another period for each of the predetermined horizontal periods. This allows collapse of symmetry between voltage application to a common voltage on a positive electrode side and voltage application to a common voltage on a negative electrode side to be moderated in a 1F period.

According to the display device of the embodiment of the disclosure, the electronic apparatus of the disclosure, and the projection display device of the disclosure, the collapse of symmetry between the voltage application to the common voltage on the positive electrode side and the voltage application to the common voltage on the negative electrode side is moderated in the 1F period, which makes it possible to suppress charge up. As a result, it is possible to suppress occurrence of temporary burning due to precharge. It is to be noted that an effect of the disclosure is not limited to the effects described here, and may be any effect described in the specification.

In the display device of the embodiment of the disclosure, in a case where the second driver performs the application of the second precharge signal voltage for each of the 1-horizontal periods while the second driver thins the application of the first precharge signal voltage for each of the predetermined horizontal periods, it is possible to suppress the occurrence of temporary burning due to precharge, for any kind of image signal.

In the display device of the embodiment of the disclosure, in a case where the second driver omits the application of the first precharge signal voltage in the whole or the portion of the horizontal period that includes no application period of each of the image signals, it is possible to reduce deliberate electric current leakage in a blanking period. As a result, it is possible to further suppress the occurrence of temporary burning due to precharge.

In the display device of the embodiment of the disclosure, in a case where the second driver uniformly assigns, to the application period of each of the image signals, the whole or the portion of the time generated as a result of the thinning of the first precharge signal voltage, even when the above-described collapse of symmetry occurs, it is possible to allow a voltage value of each pixel to approach a desired voltage value by the amount of the application period of the image signal having extended. As a result, it is possible to further suppress the occurrence of temporary burning due to precharge.

In the display device of the embodiment of the disclosure, in a case where the first precharge signal voltage is the voltage value of the lowest level of the signal voltage or is the voltage value of the level larger than the lowest level thereof, it is possible to further suppress the occurrence of temporary burning due to precharge without deteriorating a reduction effect of vertical crosstalk.

In the display device of the embodiment of the disclosure, in a case where the second driver performs the application of the first precharge signal voltage and the application of the second precharge signal voltage for each of the 1-horizontal periods, and makes the amplitude of the first precharge signal voltage smaller than the amplitude of the first precharge signal voltage in another horizontal period, for each of the predetermined horizontal periods, similarly to the above-described "thinning", it is possible to suppress the occurrence of temporary burning due to precharge, for any kind of image signal.

BRIEF DESCRIPTION OF DRAWINGS

FIG. 1 is a diagram illustrating an example of a schematic configuration of a display device according to a first embodiment of the disclosure.

FIG. 2 is a diagram illustrating an example of a schematic configuration of a display panel module.

FIG. 3 is a diagram illustrating an example of a circuit configuration of a horizontal driving circuit and a precharge circuit.

FIG. 4 is a waveform diagram that describes an example of point sequential driving performed by a controller.

FIG. 5 is a waveform diagram that describes a 1-field period.

FIG. 6 is a waveform diagram that describes a 1-horizontal period.

FIG. 7 is a diagram illustrating another example of a circuit configuration of the horizontal driving circuit and the precharge circuit.

FIG. 8 is a waveform diagram that describes an example of line sequential driving performed by a controller.

FIG. 9A is a schematic diagram that describes an example of 1F inversion driving.

FIG. 9B is a schematic diagram that describes an example of 1F1H-inversion driving.

FIG. 9C is a schematic diagram that describes an example of 1F1-dot inversion driving.

FIG. 10 is a diagram illustrating that a pixel array section performs white-black stripe display.

FIG. 11 is a diagram illustrating an example of a voltage waveform of a pixel in a white region of FIG. 10.

FIG. 12 is a diagram illustrating an example of a voltage waveform of a pixel in a black region of FIG. 10.

FIG. 13 is a diagram illustrating an example of a voltage waveform at an interval α of FIG. 11.

FIG. 14 is a diagram illustrating an example of a voltage waveform at an interval β of FIG. 11.

FIG. 15 is a diagram illustrating another example of a voltage waveform of the pixel in the white region of FIG. 10.

FIG. 16 is a diagram illustrating another example of a voltage waveform of the pixel in the black region of FIG. 10.

FIG. 17 is a waveform diagram that describes an example of a precharge signal voltage in the past.

FIG. 18 is a diagram illustrating an example of a relationship between vertical crosstalk and burning.

FIG. 19 is a waveform diagram that describes an example of a precharge signal voltage.

FIG. 20 is a waveform diagram that describes an example of the precharge signal voltage.

FIG. 21 is a waveform diagram that describes an example of the precharge signal voltage.

FIG. 22 is a waveform diagram that describes an example of the precharge signal voltage.

FIG. 23 is a waveform diagram that describes an example of the precharge signal voltage.

FIG. 24 is a waveform diagram that describes an example of the precharge signal voltage.

FIG. 25 is a waveform diagram that describes an example of the precharge signal voltage.

FIG. 26 is a waveform diagram that describes an example of the precharge signal voltage.

FIG. 27 is a waveform diagram that describes an example of the precharge signal voltage.

FIG. 28 is a waveform diagram that describes an example of the precharge signal voltage.

FIG. 29 is a waveform diagram that describes an example of the precharge signal voltage.

FIG. 30 is a waveform diagram that describes an example of the precharge signal voltage.

FIG. 31 is a waveform diagram that describes an example of the precharge signal voltage.

FIG. 32 is a waveform diagram that describes an example of the precharge signal voltage.

FIG. 33 is a waveform diagram that describes an example of the precharge signal voltage.

FIG. 34 is a waveform diagram that describes an example of the precharge signal voltage.

FIG. 35 is a waveform diagram that describes a modification example of the precharge signal voltage.

FIG. 36 is a waveform diagram that describes a modification example of the precharge signal voltage.

FIG. 37 is a waveform diagram that describes a modification example of an image signal.

FIG. 38 is a diagram illustrating a modification example of a voltage waveform of the pixel in the white region of FIG. 10.

FIG. 39 is a diagram illustrating a modification example of a voltage waveform of the pixel in the black region of FIG. 10.

FIG. 40 is a diagram illustrating a modification example of a voltage waveform of the pixel in the white region of FIG. 10.

FIG. 41 is a diagram illustrating a modification example of a voltage waveform of the pixel in the black region of FIG. 10.

FIG. 42 is a diagram illustrating an example of a perspective configuration of an electronic apparatus according to a second embodiment of the disclosure.

FIG. 43 is a diagram illustrating an example of a schematic configuration of an electronic apparatus according to a third embodiment of the disclosure.

FIG. 44 is a diagram illustrating an example of a schematic configuration of a projector according to a fourth embodiment of the disclosure.

MODES FOR CARRYING OUT THE INVENTION

Some embodiments of the disclosure are described in detail below with reference to drawings. It is to be noted that description is given in the following order.

| Contents | Main Point(s) | Drawing(s) |
| --- | --- | --- |
| 1. First Embodiment | (1) | FIGS. 1 to 20 |
|  | (1) + (2) | FIGS. 21 and 22 |
|  | (1) + (2) + (3) | FIGS. 23 and 24 |
| 2. Second Embodiment | (3) | FIGS 25 and 26 |
|  | (3) + (1) | FIGS. 27 and 28 |
|  | (3) + (2) | FIGS. 29 and 30 |
| 3. Third Embodiment | (4) | FIGS. 31 and 32 |
|  | (4) + (1) | FIGS. 33 and 34 |
| 4. Modification Example Common to Each Embodiment | (5) | FIGS. 35 and 36 |
|  | (6) | FIG. 37 |
|  | (7) | FIGS. 38 to 41 |
| 5. Fourth Embodiment (Electronic Apparatus) |  | FIG. 42 |
| 6. Fifth Embodiment (Electronic Apparatus) |  | FIG. 43 |
| 7. Sixth Embodiment (Projector) |  | FIG. 44 |

Main Point(s)

(1) A whole or a portion of a precharge signal voltage VpsigG1 in a blanking period is omitted.

(2) An application of the precharge signal voltage VpsigG1 is thinned for each predetermined 1H.

(3) The precharge signal voltage VpsigG1 is a lowest level of a signal voltage Vsig or a level larger than the lowest level thereof.

(4) An amplitude of the precharge signal voltage VpsigG1 is smaller than a precharge signal voltage VpsigG1 in another 1H for each predetermined 1H.

(5) A location for thinning is periodically changed.

(6) A whole or a portion of a time generated as a result of thinning is uniformly assigned to each writing time.

(7) The precharge signal voltage VpsigG1 is a highest level of the signal voltage Vsig or a level larger than the highest level thereof.

1. First Embodiment

[Configuration]

FIG. 1 illustrates an example of a schematic configuration of a display device 1 according to a first embodiment of the disclosure. The display device 1 is applicable as a light valve of a three-plate projector (a projection display apparatus). The display device 1 includes, for example, a pixel array section 10, a controller 20, and a liquid crystal driver 30. The pixel array section 10 may be of transmissive type or of reflective type. It is to be noted that, in a case where the pixel array section is of transmissive type, the display device 1 may include an unillustrated light source behind the pixel array section 10 as necessary.

(Pixel Array Section 10)

The pixel array section 10 generates image light by electrically changing a polarization state of light by voltage application. The pixel array section 10 has, for example, transmittance characteristics or reflectance characteristics of normally black. Here, the normally black refers to optical characteristics in which transmittance or reflectance becomes minimum to perform black display when a voltage is not applied. It is to be noted that the pixel array section 10 may have, for example, transmittance characteristics or reflectance characteristics of normally white. Here, the normally white refers to optical characteristics in which the transmittance or reflectance becomes maximum to perform white display when a voltage is not applied. In the following, description is given of the pixel array section 10 having the transmittance characteristics or reflectance characteristics of normally black.

FIG. 2 illustrates an example of a schematic configuration of a display panel module 40. The display device 1 includes the display panel module 40. The display panel module 40 includes a display panel 41 in which the pixel array section 10 and the liquid crystal driver 30 are provided on a substrate including, for example, a glass plate or a resin plate. The display panel module 40 further includes, for example, an FPC (Flexible Printed Circuits) 42 and a control substrate 43. The FPC 42 is coupled to the liquid crystal driver 30 on the display panel 41, and the control substrate 43 is coupled to the FPC 42. The control substrate 43 controls the pixel array section 10 through the liquid crystal driver 30, and includes, for example, the controller 20. The controller 20 includes, for example, an IC. It is to be noted that the controller 20 may be provided on the FPC 42 or on the substrate of the display panel module 40.

The pixel array section 10 includes a plurality of scan lines WSL extending in a row direction, a plurality of signal lines DTL extending in a column direction, and a plurality of pixels 11 that are provided one by one at respective intersections of the scan lines WSL and the signal lines DTL. In other words, the plurality of pixels 11 are disposed two-dimensionally in a matrix in the pixel array section 10, and the signal line DTL is disposed for each pixel column. Each of the pixels 11 includes, for example, a liquid crystal cell CL, a pixel transistor Tr, and a capacitor Cs. The pixel transistor Tr samples a voltage of the signal line DTL and writes the voltage in the liquid crystal cell CL, on the basis of the signal inputted from the scan line WSL. The capacitor Cs is coupled in parallel to the liquid crystal cell CL.

The pixel transistor Tr includes, for example, a thin film transistor (TFT: Thin Film Transistor). The liquid crystal cell CL includes, for example, a liquid crystal layer, a pixel electrode, and a counter electrode. The pixel electrode and the counter electrode sandwich the liquid crystal layer. The liquid crystal cell CL may further include, for example, a polarizing plate. In the liquid crystal cell CL, the pixel electrode is coupled to a source or a drain of the pixel transistor Tr, and the counter electrode is coupled to a later-described VCOM circuit 24. Examples of a display state of the liquid crystal cell CL include a TN (twisted nematic) mode, a VA (vertical alignment) mode, an IPS (in-plane switching) mode, an FFS (fringe field switching) mode, an STN (super twisted nematic) mode, or an ECB (electrically controlled birefringence) mode. In the capacitor Cs, one end thereof is coupled to the pixel electrode of the liquid crystal cell CL. The other end thereof is coupled to the pixel electrode of the crystal cell CL or to a site having an electric potential different from that of the pixel electrode, of the liquid crystal cell CL.

(Liquid Crystal Driver 30)

The liquid crystal driver 30 performs active matrix driving on each of the pixels 11 to cause the pixel array section 10 to generate image light that is based on an image signal inputted from outside. The liquid crystal driver 30 includes a vertical driving circuit 31, a horizontal driving circuit 32, and a precharge circuit 33. The vertical driving circuit 31 is coupled to the plurality of scan lines WSL. The horizontal driving circuit 32 is coupled to the plurality of signal lines. The controller 20 and the vertical driving circuit 31 correspond to a specific example of a "first driver" of the disclosure. The controller 20, the horizontal driving circuit 32, and the precharge circuit 33 correspond to a specific example of a "second driver" of the disclosure.

FIG. 3 illustrates an example of a circuit configuration of the horizontal driving circuit 32 and the precharge circuit 33. FIG. 4 is a waveform diagram that describes an example of point sequential driving performed by the controller 20. In FIG. 3 and FIG. 4, the plurality of signal lines DTL are divided into a plurality of groups (for example, 41 units), and a plurality (for example, 48 phases) of signal lines DTL are assigned to each of the groups. In other words, in FIG. 3 and FIG. 4, the signal lines DTL of 48 phases×41 units=1968 lines are provided. It is to be noted that the configuration of the horizontal driving circuit 32 is not limited to the configuration illustrated in FIG. 3.

The horizontal driving circuit 32 applies through the signal line DTL a signal voltage Vsig corresponding to an image signal DA (described later) to each of the pixels 11 of a pixel row that is selected by the horizontal driving circuit 31. Specifically, the horizontal driving circuit 32 operates on the basis of a control signal supplied from the controller 20, and outputs in a parallel manner, to the pixel array section 10, the signal voltage Vsig for each line through each of the signal lines DTL. The signal voltage Vsig has a crest value or a pulse width in accordance with a gradation of the image signal DA inputted from outside. The vertical driving circuit 31 sequentially selects each of the pixels 11 on a row basis. Specifically, the vertical driving circuit 31 operates on the basis of the control signal supplied from the controller 20, and outputs in a parallel manner, to the pixel array section 10, a drive pulse with which each of the pixels 11 is line-sequentially scanned through each of the scan lines WSL.

The horizontal driving circuit 32 includes, for example, a plurality of shift registers SR (SR(a1), SR(a2), . . . , SR(a41)) and a plurality of switch elements SWa. The plurality of shift registers SR (SR(a1), SR(a2), . . . , SR(a41)) are assigned to the groups of the signal lines DTL one by one. The plurality of switch elements SWa are assigned to the signal lines DTL one by one. In each of the shift registers SR(a1), SR(a2), . . . , SR(a41), an output end thereof is coupled to an on-off control terminal of each of the switch elements SWa in the corresponding group, and an input end thereof is coupled to the controller 20 through the FPC 42. Each of the switch elements SWa includes a plurality of switches that are assigned to the signals lines DTL one by one. In each of the switch elements SWa, one end thereof is coupled to the corresponding signal line DTL one by one, and the other end thereof is coupled to the controller 20 through the FPC 42. For example, a control signal is sequentially outputted from each of the shift registers SR to the on-off control terminal of each of the switch elements SWa in the corresponding group, on the basis of the control signal supplied from the controller 20, which causes the horizontal driving circuit 32 to sequentially output the signal voltage Vsig from each of the groups to the corresponding signal lines DTL.

The precharge circuit 33, together with the horizontal driving circuit 32, is coupled to each of the signal lines STL. The precharge circuit 33 operates on the basis of the control signal supplied from the controller 20, and outputs in a parallel manner, to the pixel array section 10, a precharge signal voltage Vpsig through each of the signal lines DTL. The precharge circuit 33 applies the precharge signal voltage Vpsig to the signal line DTL prior to the application of the signal voltage Vsig. As illustrated in FIG. 4, the precharge signal voltage Vpsig includes, for example, a precharge signal voltage VpsigB and a precharge signal voltage VpsigG. In this case, the precharge circuit 33 sequentially applies the precharge signal voltage VpsigB and the precharge signal voltage VpsigG to the signal line DTL, prior to the application of the signal voltage Vsig. The precharge signal voltage Vpsig B corresponds to a specific example of a "first precharge voltage" of the disclosure. The precharge signal voltage VpsigG corresponds to a specific example of a "second precharge voltage" of the disclosure.

The precharge signal voltage VpsigB is a signal voltage to reduce variation of the voltage of the counter electrode in each of the pixels 11. The precharge signal voltage VpsigB has a fixed value irrespective of the magnitude or the polarity of the signal voltage Vsig. For example, the precharge signal voltage VpsigB has a voltage value of a level smaller than the lowest level of the signal voltage Vsig (later-described VsigL, VsigL1, and VsigL2). The precharge signal voltage VpsigB has a relatively large amplitude as compared to an amplitude of the precharge signal voltage VpsigG. Here, the voltage VsigL is a voltage value of the lowest level of the signal voltage Vsig when a common voltage Vcom is constant. The voltage VsigL1 is a voltage value of the lowest level of the signal voltage Vsig in a case where the common voltage Vcom is a rectangular wave and when the polarity of the signal Vsig is positive. The voltage VsigL2 is a voltage value of the lowest level of the signal voltage Vsig in a case where the common voltage Vcom is a rectangular wave and when the polarity of the signal voltage Vsig is negative.

The precharge signal voltage VpsigG is a signal voltage that is outputted subsequent to the precharge signal voltage Vpsig B. In a case where the common voltage Vcom is a rectangular wave, the precharge signal voltage VpsigG includes a precharge signal voltage VpsigG1 and a precharge signal voltage VpsigG2. The precharge signal voltage VpsigG1 is a signal voltage that is outputted immediately before the signal voltage Vsig is outputted when the polarity of the signal voltage Vsig is positive. The precharge signal voltage VpsigG2 is a signal voltage that is outputted immediately before the signal voltage Vsig is outputted when the polarity of the signal voltage Vsig is negative. The precharge signal voltage VpsigG1 is a half tone level voltage of the signal voltage Vsig when the polarity of the signal voltage Vsig is positive. For example, the precharge signal voltage VpsigG1 has a voltage value slight higher than that of the later-described common voltage Vcom. The precharge signal voltage VpsigG2 is a half tone level voltage of the signal voltage Vsig when the polarity of the signal voltage Vsig is negative. For example, the precharge signal voltage VpsigG2 has a voltage value slightly lower than that of the later-described common voltage Vcom. The precharge signal voltages VpsigG, VpsigG1, and VpsigG2 each have a relatively small amplitude as compared to the amplitude of the precharge signal voltage VpsigB.

In the present embodiment, the precharge signal voltage VpsigG is applied immediately before the signal voltage Vsig is applied. This allows the insufficient writing of the signal voltage Vsig in the signal line DTL to be improved. Further, in the present embodiment, the precharge signal voltage VpsigB is applied immediately before the signal voltage Vsig is applied. This allows leakage current to forcibly flow from the pixel transistor Tr toward the signal line DTL, which reduces variation of a voltage Vpix at each of the pixels 11.

(Controller 20)

The controller 20 performs control of active matrix driving of each of the pixels 11 by the AC driving method, with respect to the liquid crystal driver 30. The AC driving method is described in detail later. The controller 20 includes a signal processing circuit 21, a timing generation circuit 22, an inversion circuit 23, the VCOM circuit 24, and a power generation circuit 25.

For example, the signal processing circuit 21 converts a digital image signal Din inputted from outside, into an analog image signal DA for the pixel array section 10, and outputs the converted image signal DA to the inversion circuit 23. For example, the signal processing circuit 21 further separates a synchronization signal Ts from the image signal Din, and outputs the separated synchronization signal Ts to the timing generation circuit 22. For example, the timing generation circuit 22 forms a horizontal start signal HST and a horizontal clock signal HCK that are synchronized with the synchronization signal Ts, and outputs the horizontal start signal HST and the horizontal clock signal HCK to the horizontal driving circuit 32. For example, the timing generation circuit 22 further forms a vertical start signal VST and a vertical clock signal VCK that are synchronized with the synchronization signal Ts, and outputs the vertical start signal VST and the vertical clock signal VCK to the vertical driving circuit 31. For example, the timing generation circuit 22 further forms an inversion control pulse that is synchronized with the synchronization signal Ts and outputs the inversion control pulse to the inversion circuit 23. For example, the timing generation circuit 22 further forms the vertical clock signal VCK that is synchronized with the synchronization signal Ts, and outputs the vertical clock signal VCK to the VCOM circuit 24. The inversion circuit 23 performs polarity inversion operation corresponding to the inversion control pulse. The inversion circuit 23 forms the signal voltage Vsig that is inverted in polarity for each 1-field period (1F), from the image signal DA. The inversion circuit 23 outputs the formed signal voltage Vsig to the horizontal driving circuit 32. The power generation circuit 25 generates voltages necessary for the signal processing circuit 21, the VCOM circuit 24, etc. and supplies the voltages to the signal processing circuit 21 and the VCOM circuit 24.

Here, for example, 1F is a period defined by the vertical start signal VST, as illustrated in FIG. 5. The start time of the 1F corresponds to a rising time of the vertical start signal VST. The end time of the 1F corresponds to a rising time of the vertical start signal VST that is first generated after the 1F is started. It is to be noted that the 1F may be a period defined by a pulse waveform of the common voltage Vcom. In this case, the 1F corresponds to a period from a rising time to a falling time of the common voltage Vcom, or a period from the falling time to the rising time of the common voltage Vcom.

The 1F includes an effective display period Ta in which the signal voltage Vsig is applied to the pixel array section 10, and a blanking period Tb that is provided before or after, or both before and after the effective display period Ta. In the present embodiment, only one effective display period Ta is provided in the 1F, and the blanking period Tb includes a blanking period Tb1 that is provided before the effective display period Ta and a blanking period Tb2 that is provided after the effective display period Ta. In the effective display period Ta, the signal voltages Vsig of all lines are sequentially outputted from the horizontal driving circuit 32 to each of the signal lines DTL, with every signal voltage Vsig of one line, in synchronization with the vertical clock signal VCK. The blanking period Tb is a period in which no image is displayed on the pixel array section 10 and various types of signal processing are performed.

For example, the horizontal start signal HST defines 1-horizontal period (1H), as illustrated in FIG. 6. The start time of the 1H corresponds to a rising time of the horizontal start signal HST. The end time of the 1H corresponds to a rising time of the horizontal start signal HST that is first generated after the 1H is started. Each 1H within the effective display period Ta includes an effective display period Tc in which the signal voltage Vsig is applied to the pixel array section 10, and a blanking period Td that is provided before or after, or both before and after the effective display period Tc. In the present embodiment, only one effective display period Tc is provided in the 1H, and the blanking period Td includes a blanking period Td1 that is provided before the effective display period Tc and a blanking period Td2 that is provided after the effective display period Tc. In the effective display period Tc, the signal voltage Vsig for one line is simultaneously outputted to each of the signal lines DTL from the horizontal driving circuit 32 at a time in synchronization with the horizontal clock signal HCK, or sequentially outputted for each group of the signal lines DTL. The blanking period Td is a period in which no image is displayed on the pixel array section 10.

The VCOM circuit 24 generates a predetermined common voltage Vcom and applies the common voltage Vcom to the counter electrode of the liquid crystal cell CL. For example, in a case of performing DC driving, the VCOM circuit 24 makes the common voltage Vcom constant and applies the common voltage Vcom to the counter electrode of the liquid crystal cell CL. For example, in a case of performing AC driving, the VCOM circuit 24 applies the common voltage Vcom that is changed in pulse in synchronization with the vertical start signal VST, to the counter electrode of the liquid crystal cell CL. At this time, the VCOM circuit 24 forms the common voltage Vcom that is inverted in polarity for each 1F, and applies the formed common voltage Vcom to the counter electrode of the liquid crystal cell CL.

FIG. 7 illustrates another example of the circuit configuration of the horizontal driving circuit 32 and the precharge circuit 33. FIG. 8 is a waveform diagram that describes an example of line sequential driving performed by the controller 20. In FIG. 7 and FIG. 8, the plurality of signal lines DTL are divided into a plurality of groups (for example, 41 cells), and a plurality (for example, 48 channels) of signal lines DTL are assigned to each of the groups. In other words, in FIG. 7 and FIG. 8, signal lines DTL of 48 channels×41 cells=1968 lines are provided. It is to be noted that the configuration of the horizontal driving circuit 32 is not limited to the configuration illustrated in FIG. 5.

For example, the horizontal driving circuit 32 includes a plurality of selection lines SEL (SEL(1), SEL(2), ..., SEL(41)) and a plurality of switch elements SWb. The plurality of selection lines SEL (SEL(1), SEL(2), ..., SEL(41)) are assigned to the groups of the signal lines DTL one by one. The plurality of switch elements SWb are assigned to the signal lines DTL one by one in each of the groups of the signal lines DTL. In a case where the plurality of switch elements SWb that are different in corresponding selection line SEL from one another are grouped as one switch group, and all of the switches SWb are assigned to any of the switch groups, in each of the switch groups, one ends thereof are coupled to the signal lines different from one another, and the other ends are coupled to a common wiring (hereinafter, referred to as "common wiring"). The common wirings are assigned to the respective switch groups one by one, and are electrically separated from one another. Each of the common wirings is coupled to the controller 20 through the FPC 42. For example, the switches SWb are sequentially turned ON for each of the groups of the signal lines DTL, on the basis of the control signal supplied from the controller 20, which causes the horizontal driving circuit 32 to sequentially output the signal voltage Vsig to each of the groups of the signal lines DTL.

(AC Driving)

The horizontal driving circuit 32 performs AC driving in which a polarity of the signal voltage Vsig applied to the pixel electrode of the liquid crystal cell CL with respect to the electric potential of the counter electrode of the liquid crystal cell CL (the common voltage Vcom) is caused to be inverted at a predetermined period. This allows deterioration of resistivity (a resistance value inherent to a substance) of the liquid crystal, etc., or occurrence of an afterimage phenomenon called "burning" to be suppressed.

FIGS. 9A, 9B, and 9C each are a schematic diagram that describes the AC driving of the present embodiment. In FIGS. 9A, 9B, and 9C, a symbol "+" indicates that the polarity of the signal voltage Vsig is positive with respect to the common voltage Vcom. In FIGS. 9A, 9B, and 9C, a symbol "−" indicates that the polarity of the signal voltage Vsig is negative with respect to the common voltage Vcom. In other words, the symbols "+" and "−" indicate relative magnitude relationship of the signal voltage Vsig with respect to the common voltage Vcom.

Examples of the AC driving include, as illustrated in FIG. 9A, 1F inversion driving in which, while the common voltage Vcom is made constant, the polarity of the signal voltage Vsig is inverted for each 1F, and not only the polarity of the signal voltage Vsig but also the polarity of the common voltage Vcom are inverted for each 1F. Beside this, examples of the AC driving also include, as illustrated in FIG. 9B, 1F1H-inversion driving in which, while the common voltage Vcom is made constant, the polarity of the signal voltage Vsig is inverted for each 1F as well as for each 1H and not only the polarity of the signal voltage Vsig but also the polarity of the common voltage Vcom are inverted for each 1F as well as each 1H. Further, besides these, examples of the AC driving include, as illustrated in FIG. 9C, 1F1-dot inversion driving in which, while the common voltage Vcom is made constant, the polarity of the signal voltage Vsig is inverted for each 1F as well as 1-dot and not only the polarity of the signal voltage Vsig but also the polarity of the common voltage Vcom are inverted for each 1F as well as for each 1-dot.

Next, description is given to an example of the 1F inversion driving of the present embodiment. FIG. 10 illustrates that the pixel array section 10 performs white-black stripe display. FIG. 10 exemplifies the white-black stripe display in which a black region 10B that extends in a vertical direction is sandwiched by two white regions 10A and 10C that extend in the vertical direction. FIGS. 11 to 16 each illustrate an example of a 1F inversion driving waveform of the present embodiment. FIGS. 11 to 14 each illustrate an example of a waveform of Vcom DC driving in which the common voltage Vcom is made constant (DC). FIGS. 15 and 16 each illustrate an example of a waveform of Vcom AC driving in which the common voltage Vcom is made rectangular (AC).

FIGS. 11 and 15 each illustrate a waveform of a voltage Vdt1W of the signal line DTL in the white regions 10A and 10C, with voltage displacement of a voltage VpixW of the pixel 11 in the white regions 10A and 10C. The voltage VpixW is a voltage waveform in which the signal voltage Vsig and the precharge signal voltage Vpsig are added together. FIGS. 12 and 16 each illustrate a waveform of a voltage Vdt1B of the signal line DTL in the black region 10B, with voltage displacement of a voltage VpixB of the pixel 11 in the black region 10B. The voltage VpixB is a voltage waveform in which the signal voltage Vsig and the precharge signal voltage Vpsig are added together. FIG. 13 illustrates an example of a voltage waveform at an interval α of FIG. 11. FIG. 14 illustrates an example of a voltage waveform at an interval β of FIG. 11.

(Regarding White Regions 10A and 10C)

In FIGS. 11, 13, and 14, the signal voltage Vsig is a waveform that is inverted for each 1F with the common voltage Vcom as a middle. The common voltage Vcom is fixed irrespective of the signal voltage Vsig. Therefore, the amplitude of the signal voltage Vsig is generally constant on the basis of the common voltage Vcom. At this time, the amplitude of the signal voltage Vsig is as large as the size corresponding to the white display. Further, in FIGS. 11, 13, and 14, the precharge signal voltages VpsigG1 and VpsigG2 each are a value corresponding to the polarity of the signal voltage Vsig. Here, the amplitude of the precharge signal voltages VpsigG1 and VpsigG2 each are generally constant on the basis of the common voltage Vcom. In FIGS. 11, 13, and 14, the precharge signal voltage VpsigB is a value that is fixed irrespective of the polarity of the signal voltage Vsig, and has the polarity of "−" over the whole 1F. Therefore, the precharge signal voltage VpsigB is biased toward the polarity side of "−" on the basis of the common voltage Vcom.

Here, the precharge signal voltage VpsigB causes leakage current to forcibly flow from the pixel transistor Tr toward the signal line DTL. When the signal voltage Vsig is white display, the precharge signal voltage VpsigG1 serves as a signal voltage that causes the leakage voltage to forcibly flow from the pixel transistor Tr toward the signal line DTL. Therefore, as illustrated in FIG. 13, when the polarity of the signal voltage Vsig is positive, the voltage Vdt1W of the signal line DTL in the white regions 10A and 10C is reduced from a desired value due to the precharge signal voltages VpsigB and VpsigG1 during the period in which the pixel transistor Tr is turned OFF.

When the signal voltage Vsig is white display, the precharge signal voltage VpsigG2 serves as a signal voltage that causes the leakage voltage to forcibly flow from the signal line DTL toward the pixel transistor Tr. Therefore, as illustrated in FIG. 14, when the polarity of the signal voltage Vsig is negative, the voltage Vdt1W of the signal line DTL in the white regions 10A and 10C slightly rises from a desired value due to the precharge signal voltage VpsigG2 during the period in which the pixel transistor Tr is turned OFF. At this time, the precharge signal voltage VpsigB has a voltage that is equal to or substantially equal to the signal voltage Vsig, a result of which the voltage Vdt1W of the signal line DTL in the white regions 10A and 10C fluctuates little due to the precharge signal voltage VpsigB.

From the above, the voltage Vdt1W of the signal line DTL in the white regions 10A and 10C is influenced by the precharge signal voltage VpsigB, thereby being reduced from the desired value. In other words, the asymmetry of the precharge signal voltage VpsigB with respect to the common voltage Vcom causes the reduction of the voltage Vdt1W of the signal line DTL in the white regions 10A and 10C from the desired value. As a result, temporary burning occurs in the white regions 10A and 10C. This "temporary burning" may be eliminated, for example, by continuously performing monochromatic display on the display device 1 for a predetermined period or by keeping the power of the display device 1 OFF for a predetermined period.

(Regarding Black Region 10B)

In FIG. 12, the signal voltage Vsig is black display. Therefore, the signal voltage Vsig has a voltage value that is equal to or substantially equal to the common voltage Vcom that is fixed irrespective of the signal voltage Vsig. Further, in FIG. 12, the precharge signal voltages VpsigG1 and VpsigG2 each are a value corresponding to the polarity of the signal voltage Vsig. Here, the amplitude of the precharge signal voltages VpsigG1 and VpsigG2 each are generally constant on the basis of the common voltage Vcom. In FIG. 12, the precharge signal voltage VpsigB is a value that is fixed irrespective of the polarity of the signal voltage Vsig, and has the negative polarity over the whole 1F. Therefore, precharge signal voltage VpsigB is biased toward the negative polarity side on the basis of the common voltage Vcom.

Here, precharge signal voltage VpsigB causes the leakage current to forcibly flow from the pixel transistor Tr toward the signal line DTL. When the signal voltage Vsig is in low gradation, the precharge signal voltage VpsigG2 serves as a signal voltage that causes the leakage voltage to forcibly flow from the pixel transistor Tr toward the signal line DTL. Therefore, as illustrated in FIG. 12, the voltage Vdt1B of the signal line DTL in the black region 10B is reduced, irrespective of the polarity of the signal voltage Vsig, from the desired value due to the precharge signal voltage VpsigB and VpsigG2 during the period in which the pixel transistor Tr is turned OFF. In other words, the asymmetry of the precharge signal voltage VpsigB with respect to the common voltage Vcom causes the reduction of the voltage Vdt1B of the signal line DTL in the black region 10B from the desired value. As a result, temporary burning occurs in the black region 10B as well.

Incidentally, When the signal voltage Vsig is in low gradation, the precharge signal voltage VpsigG1 serves as a signal voltage that causes the leakage voltage to forcibly flow from the signal line DTL toward the pixel transistor Tr. Further, the reduction amount of the voltage VpixW in the white regions 10A and 10C is significantly larger than the reduction amount of the voltage VpixB in the black region 10B. Therefore, the degree of the temporary burning differs between the white regions 10A and 10C and the black regions 10B. Accordingly, in a case where the pixel array section 10 performs the white-black stripe display including both the white regions 10A and 10C and the black region 10B therein, following which the pixel array section 10 performs the monochromatic display (for example, low luminance display), a white-black stripe pattern may appear on the pixel array section 10. This phenomenon may also appear in the Vcom AC driving illustrated in FIGS. 15 and 16.

Therefore, the controller 20 controls the application of the precharge signal voltage VpsigB so that the difference in the reduction amounts between the voltage VpixW in the white regions 10A and 10C and the voltage VpixB in the black region 10B is reduced (in other words, so that the temporary burning becomes less conspicuous). For example, thinning the application of the precharge signal voltage VpsigB is considered. "Thinning" indicates omitting at least a portion of a plurality of the precharge signal voltages VpsigB that are included in the period in which the polarity of the signal voltage Vsig is positive in a case where the precharge signal voltage VpsigB is applied for each 1H, as illustrated in FIG. 17, for example.

Thinning the application of the precharge signal voltage VpsigB shortens the total application time of the precharge signal voltage VpsigB. As a result, as illustrated in FIG. 18, the temporary burning tends to become less conspicuous, for example. However, as illustrated in FIG. 18, as the total application time of the precharge signal voltage VpsigB shortens, the vertical crosstalk deteriorates, for example. Therefore, the controller 20 preferably controls the application of the precharge signal voltage VpsigB so that the temporary burning becomes less conspicuous while the deterioration of the vertical crosstalk is minimized.

Specifically, the controller 20 performs control of omitting the application of the precharge signal voltage VpsigB in all or a portion of 1Hs included in a vertical blanking period Tb. At this time, for example, as illustrated in FIGS. 19 and 20, the precharge circuit 33 omits the application of the precharge signal voltage VpsigB in all or the portion of the 1Hs included in the vertical blanking period Tb (Tb1, Tb2) on the basis of the control signal supplied from the controller 20. It is to be noted that FIG. 19 illustrates an example of a voltage waveform in the Vcom DC driving. FIG. 20 illustrates an example of a voltage waveform in the Vcom AC driving.

Further, the controller 20 may control the application of the precharge signal voltage VpsigB so that the amount of the leak of the electric current from the pixel 11 to the signal line DTL due to the application of the precharge signal voltage VpsigB becomes smaller than that in another period for each predetermined 1H. At this time, the precharge circuit 33 performs the application of the precharge signal voltage VpsigB so that the amount of the electric current leakage from the pixel 11 to the signal line DTL due to the application of the precharge signal voltage VpsigB becomes smaller than that in another period for each predetermined 1H.

For example, the controller 20 may perform controlling the precharge circuit 33 in such a manner as to perform the application of the precharge signal voltage VpsigG for each 1-horizontal period while thinning the application of the precharge signal voltage VpsigB for each predetermined 1H. At this time, as illustrated in FIGS. 21 and 22, the precharge circuit 33 performs the application of the precharge signal voltage VpsigG for each 1-horizontal period while thinning the application of the precharge signal voltage VpsigB for each predetermined 1H on the basis of the control signal supplied from the controller 20, for example. It is to be noted that FIG. 21 illustrates an example of a voltage waveform in the Vcom DC driving. FIG. 22 illustrates an example of a voltage waveform in the Vcom AC driving. FIGS. 21 and 22 illustrate that the application of the precharge signal voltage VpsigB is omitted for each 1H.

The controller 20 preferably thins the application of the precharge signal voltage VpsigB so that the application interval of the precharge signal voltage VpsigB becomes equal. For example, the controller 20 may thin the precharge signal voltage VpsigB for each even pixel row or may thin the precharge signal voltage VpsigB for each odd pixel row. For example, the controller 20 may thin three precharge signal voltages VpsigB for each 4H.

Furthermore, the controller 20 may set the precharge signal voltage VpsigB to a voltage value of the lowest level (VsigL2, VsigL) of the signal voltage Vsig or a voltage value of a level larger than the lowest level thereof. At this time, for example, as illustrated in FIGS. 23 and 24, the precharge circuit 33 outputs the precharge signal voltage VpsigB that is set to the voltage value of the lowest level (VsigL2, VsigL) of the signal voltage Vsig or the voltage value of a level larger than the lowest level thereof on the basis of the control signal supplied from the controller 20. It is to be noted that FIG. 23 illustrates an example of a voltage waveform in the Vcom DC driving. FIG. 24 illustrates an example of a voltage waveform in the Vcom AC driving.

[Effects]

Next, description is given of effects of the display device 1 of the present embodiment.

In order to prevent burning of a liquid crystal cell, an AC driving method has been adopted in the past which inverts, at a predetermined period, a polarity of a signal voltage applied to a pixel electrode of the liquid crystal cell with respect to an electric potential of a counter electrode of the liquid crystal cell. However, in the AC driving method, fluctuations of an electric potential of a signal line may be seen on a display screen as a vertical streak. Therefore, a precharge system has been adopted together with the AC driving method. The precharge system writes in the signal line a precharge signal voltage of a half tone level prior to writing the image signal.

However, setting the precharge signal level to the half tone level causes vertical crosstalk, which leads to deterioration of image quality. Therefore, as a method to reduce both the vertical crosstalk and the above-described vertical streak, for example, a two-step precharge system is adopted at present which sequentially applies to a signal line both the black level and the gray level of the precharge signal level in a horizontal blanking period. However, electric current leakage is performed forcibly in the two-step precharge system. Therefore, the symmetry between voltage application to a common voltage on a positive side and voltage application to a common voltage on a negative side is collapsed in a 1F period. This causes an electric field in a liquid crystal cell. The electric field then causes charge up in which impurity ions included in the liquid crystal cell are concentrated at an interface of a pixel electrode or a counter electrode. As a result, there has been an issue of occurrence of temporary burning.

In contrast, in the present embodiment, the application of the precharge signal voltage VpsigB is omitted in the whole or the portion of the horizontal period included in the vertical blanking period Tb (Tb1, Tb2). This allows the collapse of the symmetry between the voltage application to the common voltage Vcom on the positive side and the voltage application to the common voltage Vcom on the negative side to be moderated in the 1F period, making it possible to suppress charge up. As a result, it is possible to suppress the occurrence of the temporary burning due to the precharge signal voltage Vpsig.

Further, in the present embodiment, in a case where the application of the precharge signal voltage VpsigB is performed so that the amount of the leak of the electric current from the pixel 11 to the signal line DTL due to the application of the precharge signal voltage VpsigB becomes smaller than that in another period for each of the predetermined 1Hs, it is possible to moderate the collapse of symmetry between the voltage application to the common voltage Vcom on the positive electrode side and the voltage application to the common voltage Vcom on the negative electrode side, in the 1F period. As a result, it is possible to suppress the occurrence of the temporary burning due to the precharge signal voltage Vpsig more effectively.

For example, in the present embodiment, the application of the precharge signal voltage VpsigG is performed for each 1H while the application of the precharge signal voltage VpsigB is thinned for each predetermined 1H, which makes it possible to moderate the collapse of the symmetry between the voltage application to the common voltage Vcom on the positive electrode side and the voltage application to the common voltage Vcom on the negative electrode side in the 1F, for any kind of image signal DA. As a result, it is possible to suppress the occurrence of the temporary burning due to the precharge signal voltage Vpsig more effectively.

Further, in the present embodiment, in a case where the precharge signal voltage VpsigB is set to the voltage value of the lowest level (VsigL2, VsigL) of the signal voltage Vsig or the voltage value of a level larger than the lowest level thereof, it is possible to reduce the amount of the leak of the electric current by the amount of the amplitude of the precharge signal voltage VpsigB having become shallow. As a result, it is possible to suppress the occurrence of the temporary burning due to the precharge signal voltage Vpsig more effectively.

2. Second Embodiment

FIGS. 25 and 26 each are a waveform diagram for describing an example of the precharge signal voltage Vpsig in a display device 2 according to the second embodiment of the disclosure. In the present embodiment, the controller 20 sets the precharge signal voltage VpsigB to a voltage value of the lowest level (VsigL2, VsigL) of the signal voltage Vsig or a voltage value of a level larger than the lowest level thereof. At this time, as illustrated in FIGS. 25 and 26, the precharge circuit 33 outputs to the signal line DTL the precharge signal voltage VpsigB that is set to the voltage value of the lowest level (VsigL2, VsigL) of the signal voltage Vsig or the voltage value of a level larger than the lowest level thereof on the basis of the control signal supplied from the controller 20, for example. This makes it possible to reduce the amount of the leak of the electric current by the amount of the amplitude of the precharge signal voltage VpsigB having become shallow. As a result, it is possible to suppress the occurrence of the temporary burning due to the precharge signal voltage Vpsig more effectively.

In the present embodiment, the controller 20 further may control the precharge circuit 33 so that the application of the precharge signal voltage VpsigB in all or the portion of the 1Hs included in the vertical blanking period Tb (Tb1, Tb2) is omitted. At this time, as illustrated in FIGS. 27 and 28, the precharge circuit 33 omits the application of the precharge signal voltage VpsigB in all or the portion of the 1Hs included in the vertical blanking period Tb (Tb1, Tb2), on the basis of the control signal supplied from the controller 20, for example. This allows the collapse of the symmetry between the voltage application to the common voltage Vcom on the positive electrode side and the voltage application to the common voltage Vcom on the negative electrode side to be moderated in the 1F period, making it possible to suppress charge up. As a result, it is possible to suppress the occurrence of the temporary burning due to the precharge signal voltage Vpsig.

Furthermore, in the present embodiment, the controller 20 may further control the precharge circuit 33 in such a manner as to perform the application of the precharge signal voltage VpsigG for each 1H while thinning the application of the precharge signal voltage VpsigB for each predetermined 1H. At this time, as illustrated in FIGS. 29 and 30, the precharge circuit 33 performs the application of the precharge signal voltage VpsigG for each 1H while thinning the application of the precharge signal voltage VpsigB for each predetermined 1H on the basis of the control signal supplied from the controller 20, for example. This makes it possible to moderate the collapse of the symmetry between the voltage application to the common voltage Vcom on the positive electrode side and the voltage application to the common voltage Vcom on the negative electrode side in the 1F, for any kind of image signal DA. As a result, it is possible to suppress the occurrence of the temporary burning due to the precharge signal voltage Vpsig more effectively.

3. Third Embodiment

FIGS. 31 and 32 each are a waveform diagram for describing an example of the precharge signal Vpsig in a display device 3 according to the third embodiment of the disclosure. In the present embodiment, the controller 20 controls the precharge circuit 33 in such a manner as to perform the applications of the precharge signal VpsigB and the precharge signal VpsigG (VpsigG1, VpsigG2) for each 1H. The controller 20 further sets the amplitude of the precharge signal VpsigB to a value smaller than an amplitude of the precharge signal VpsigB in another 1H, for each predetermined 1H. At this time, as illustrated in FIGS. 31 and 32, the precharge circuit 33 performs the application of the precharge signal VpsigB and the precharge signal VpsigG (VpsigG1, VpsigG2) for each 1H on the basis of the control signal supplied from the controller 20, and outputs to the signal line DTL the precharge signal VpsigB that is set to have an amplitude smaller than the amplitude of the precharge signal VpsigB in another 1H, for example. This makes it possible to moderate the collapse of the symmetry between the voltage application to the common voltage Vcom on the positive electrode side and the voltage application to the common voltage Vcom on the negative electrode side in the 1F, for any kind of image signal DA. As a result, it is possible to suppress the occurrence of the temporary burning due to the precharge signal voltage Vpsig more effectively.

Furthermore, in the present embodiment, the controller 20 may further set the precharge signal voltage VpsigB to the voltage value of the lowest level (VsigL2, VsigL) of the signal voltage Vsig or the voltage value of a level larger than the lowest level thereof. At this time, as illustrated in FIGS. 33 and 34, the precharge circuit 33 outputs to the signal line DTL the recharge signal voltage VsigB that is set to the voltage value of the lowest level (VsigL2, VsigL) of the signal voltage Vsig or the voltage value of a level larger than the lowest level thereof, on the basis of the control signal supplied from the controller 20, for example. This makes it possible to reduce the amount of the leak of the electric current by the amount of the amplitude of the precharge signal voltage VpsigB having become shallow. As a result, it is possible to suppress the occurrence of the temporary burning due to the precharge signal voltage Vpsig more effectively.

4. Modification Example Common to Each Embodiment

Modification Example A

FIGS. 35 and 36 each are a waveform diagram for describing a modification example of the precharge signal Vpsig. In the above-described embodiments and these modification examples, the controller 20 may change the location where the precharge signal voltage VpsigB is thinned for each predetermined period (for example, 1F). For example, as illustrated in FIG. 35, the controller 20 may thin the precharge signal voltage VpsigB for each even pixel row in a certain 1F, following which the controller 20 may thin the precharge signal voltage VpsigB for each odd pixel row in a subsequent 1F. For example, as illustrated in FIG. 36, the controller 20 may thin three precharge signal voltages VpsigB for each 4H, and may change, for each 1F, the combination of the three precharge signal voltages VpsigB that are thinned for each 4H.

In the existing driving, the precharge signal voltage VpsigB is applied once for each H. To the contrary, in the present embodiment and the modification example, in order to suppress the influence from the electric current leakage in the pixel transistor Tr, the controller 20 controls the precharge circuit 33 so that the precharge signal voltage VpsigB is applied to the signal line DTL at the number of times no less than 1 time and less than n times, for a plurality of Hs (nH). Thereafter, the precharge circuit 33 applies to the signal line DTL the precharge signal voltage VpsigB at the number of times no less than 1 time and less than n times, for a plurality of Hs (nH), on the basis of the control signal supplied from the controller 20. At this time, the precharge signal voltage VpsigB may be applied at any H of the plurality of Hs (nH). Further, in a case where the precharge signal voltage VpsigB is applied to the signal line DTL at the number of times no less than 1 time and less than n times, for a plurality of Hs (nH), and when two or more values are selectable as electric potentials of the precharge signal voltage VpsigB, the electric potential of each of the precharge signal voltages VpsigB may differ from each other.

This makes it possible to moderate the collapse of the symmetry between the voltage application to the common voltage Vcom on the positive electrode side and the voltage application to the common voltage Vcom on the negative electrode side in the 1F period, for any kind of image signal DA. As a result, it is possible to suppress the occurrence of the temporary burning due to the precharge signal voltage Vpsig more effectively.

Modification Example B

FIG. 37 is a waveform diagram for describing a modification example of the precharge signal Vpsig. In the above-described embodiments and these modification examples, the controller 20 may uniformly assign a whole or a portion of the time generated as a result of the thinning of the precharge signal VpsigB to the application period of each of the image signals DA (the signal voltage Vsig). As illustrated in FIG. 37, the controller 20 may thin the three precharge signals VpsigB for each 4H, and may uniformly assign the time generated as a result of the thinning of the three precharge signals VpsigB to the application period of each of the image signals DA (the signal voltage Vsig), for example. This makes it possible to allow the voltage value of each pixel 11 to approach a desired voltage value by the amount of the application period of the image signal DA (the signal voltage Vsig) having extended even when the above-described collapse of the symmetry has occurred. As a result, it is possible to further suppress the occurrence of the temporary burning due to the precharge.

Modification Example C

FIG. 38 illustrates a modification example of a voltage waveform of the pixel 11 in the white regions 10A and 10C of FIG. 10. FIG. 39 illustrates a modification example of a voltage waveform of the pixel 11 in the black region 10B of FIG. 10.

In the above-described embodiments and these modification examples, the controller 20 may set the precharge signal voltage VpsigB to a voltage value of the highest level of the signal voltage Vsig or a voltage value of a level larger than the highest level thereof. At this time, as illustrated in FIGS. 38 and 39, the precharge circuit 33 outputs the precharge signal voltage VpsigB that is set to the voltage value of the highest level of the signal voltage Vsig or the voltage value of a level larger than the highest level thereof on the basis of the control signal supplied from the controller 20, for example. It is to be noted that FIG. 38 illustrates an example of a voltage waveform in the Vcom DC driving. FIG. 39 illustrates an example of a voltage waveform in the Vcom AC driving. FIG. 40 illustrates a modification example of a voltage waveform of the pixel 11 in the white regions 10A and 10C of FIG. 10. FIG. 41 illustrates a modification example of a voltage waveform of the pixel 11 in the black region 10B of FIG. 10.

The controller 20 may set the precharge signal voltage VpsigB to the voltage value of the highest level of the signal voltage Vsig or the voltage value of a level larger than the highest level thereof. At this time, as illustrated in FIGS. 40 and 41, the precharge circuit 33 outputs the precharge signal voltage VpsigB that is set to the voltage value of the highest level of the signal voltage Vsig or the voltage value of a level larger than the highest level thereof on the basis of the control signal supplied from the controller 20, for example. It is to be noted that FIG. 40 illustrates an example of a voltage waveform in the Vcom DC driving. FIG. 41 illustrates an example of a voltage waveform in the Vcom AC driving.

In the present modification example, the precharge signal voltage VpsigB is set to the voltage value of the highest level of the signal voltage Vsig or the voltage value of a level larger than the highest level thereof. This makes it possible to further suppress the occurrence of the temporary burning due to the precharge even when the above-described collapse of the symmetry has occurred.

5. Fourth Embodiment

Next, description is given of an electronic apparatus 4 according to the fourth embodiment of the disclosure. FIG. 42 illustrates a perspective configuration example of the electronic apparatus 4. The electronic apparatus 4 is, for example, a mobile terminal including a display surface 4A on a main surface of a plate-like housing. The electronic apparatus 4 includes the display device 1, 2, or 3 according to the corresponding one of the above-described embodiments and the modification examples, at the position of the display surface 4A. In the present embodiment, the display device 1, 2, or 3 is provided. This allows the similar effect to that of each of the above-described embodiments to be obtained.

6. Fifth Embodiment

Next, description is given of an electronic apparatus 5 according to the fifth embodiment of the present disclosure. FIG. 43 illustrates a perspective configuration example of an electronic apparatus 5 according to the present embodiment. The electronic apparatus 5 is, for example, a notebook personal computer that includes a display surface 5A on a main surface of one of two plate-like foldable housings. The electronic apparatus 5 includes the display device 1, 2, or 3 according to the corresponding one of the above-described embodiments and the modification examples, at the position of the display surface 5A. In the present embodiment, the display devices 1, 2, and 3 are provided. This allows the effect similar to that of each of the above-described embodiments to be achieved.

7. Sixth Embodiment

[Configuration]

Next, description is given of a projector 6 according to the sixth embodiment of the disclosure. The projector 6 corresponds to a specific example of a "projection display apparatus" in the disclosure. FIG. 44 illustrates a schematic surface configuration example of the projector 6 according to the sixth embodiment of the disclosure. The projector 6 includes, for example, a light source unit 7, an image generation system 8, and a projection optical system 9.

The image generation system 8 modulates light (for example, white color light) emitted from the light source unit 7 on the basis of an image signal, to generate image light of a plurality of colors, synthesizes the generated image light of the plurality of colors, and then outputs the synthesized light to the projection optical system 9. The image generation system 8 includes an illumination optical system 810, an image generator 820, and an image synthesizer 830. The projection optical system 9 projects the image light (the synthesized image light) outputted from the image generation system 8 to a screen, etc. The image generation system 8 corresponds to a specific example of a "light modulator" in the disclosure. The projection optical system 9 corresponds to a specific example of a "projection section" in the disclosure.

The illumination optical system 810 separates the light (for example, white color light) emitted from the light source unit 7 into plural pieces of light of respective colors. For example, the illumination optical system 810 includes an integrator element 811, a polarization conversion element 812, a condenser lens 813, dichroic mirrors 814 and 815, and mirrors 816 to 818. The integrator element 811 includes, for example, a fly-eye lens 811a and a fly-eye lens 811b. The fly-eye lens 811a includes a plurality of microlenses that are two-dimensionally arranged. The fly-eye lens 811b also includes a plurality of microlenses that are two-dimensionally arranged. The fly-eye lens 811a divides the light (for example, white color light) emitted from the light source unit 7 into a plurality of light fluxes, and causes an image of each of the light fluxes to be formed on each of the microlenses of the fly-eye lens 811b. The fly-eye lens 811b functions as a secondary light source and causes a plurality of parallel pieces of light with uniform luminance to enter the polarization conversion element 812. The dichroic mirrors 814 and 815 each selectively reflect color light of a predetermined wavelength range, and allow light of other wavelength ranges to pass therethrough. The dichroic mirror 814 selectively reflects, for example, red color light. The dichroic mirror 815 selectively reflects, for example, green color light.

The image generator 820 modulates the light of the respective colors separated by the illumination optical system 810, and generates the image light of the respective colors, on the basis of image signals corresponding to the respective colors inputted from outside. The image generator 820 includes, for example, a light valve 821 for red color light, a light valve 822 for green color light, and a light valve 823 for blue color light. The light valve 821 for red color light modulates the red color light inputted from the illumination optical system 810 to generate image light of red color, on the basis of the image signal that corresponds to red color and that is inputted from outside. The light valve 822 for green color light modulates the green color light inputted from the illumination optical system 810 to generate image light of green color, on the basis of the image signal that corresponds to green color and that is provided from outside. The light valve 823 for blue color light modulates the blue color light inputted from the illumination optical system 810 to generate image light of blue color, on the basis of the image signal that corresponds to blue color and that is inputted from outside. Each of the light valve 621 for red color light, the light valve 622 for green color light, and the light valve 623 for blue color light includes the display device 1, 2, or 3 according to corresponding one of the above-described embodiments and modification examples.

The image synthesizer 830 synthesizes the image light of the respective colors generated by the image generator 820, thereby generating color image light.

[Effects]

Next, effects of the projector 6 according to the present embodiment are described.

In the present embodiment, the display device 1, 2, or 3 according to the corresponding one of the above-described embodiments and modifications are used as the light valve 821 for red color light, the light valve 822 for green color light, and the light valve 823 for blue color light. The display device 1, 2, or 3 according to the corresponding one of the above-described embodiments and the modification examples are provided. This allows the effect similar to that of the above-described embodiments to be achieved.

Hereinbefore, although the disclosure has been described with reference to the six embodiments and the modification examples thereof, the disclosure is not limited to each of the above-described embodiments, and various modifications may be made. It is to be noted that the effects described in the present specification are illustrative and non-limiting. The effects of the disclosure are not limited to those described in the present specification. The disclosure may achieve effects other than those described in the present specification.

Further, the disclosure may have the following configurations.

(1)

A display device including:

a pixel array section including a plurality of pixels that are disposed two-dimensionally in a matrix, and a signal line that is disposed for each pixel column;

a first driver that sequentially selects each of the pixels on a row basis; and a second driver that applies, through the signal line, an image signal to each of the pixels in a pixel row that is selected by the first driver, and that inverts a polarity of the image signal at a predetermined period, the second driver sequentially applying, to the signal line, a first precharge signal voltage having a relatively large amplitude and a second precharge signal voltage having a relatively small amplitude, prior to the application of the image signal, and the second driver further controlling the application of the first precharge signal voltage to cause an amount of leak of an electric current from the pixel to the signal line due to the application of the first precharge signal voltage to become smaller than that in another period for each of predetermined horizontal periods.

(2)

The display device according to (1), in which the second driver performs the application of the second precharge signal voltage for each 1-horizontal period while the second driver thins the application of the first precharge signal voltage for each of the predetermined horizontal periods, and the second driver omits the application of the first precharge signal voltage in a whole or a portion of a horizontal period that includes no application period of each of the image signals.

(3)

The display device according to (1) or (2), in which the second driver performs the application of the second precharge signal voltage for each 1-horizontal period while the second driver thins the application of the first precharge signal voltage for each of the predetermined horizontal periods, and the first precharge signal voltage is a voltage value of a lowest level of the image signal or is a voltage value of a level larger than the lowest level thereof.

(4)

The display device according to (1), in which the second driver performs the application of the first precharge signal voltage and the application of the second precharge signal voltage for each 1-horizontal period, and makes an amplitude of the first precharge signal voltage smaller than an amplitude of the first precharge signal voltage in another horizontal period, for each of the predetermined horizontal periods.

(5)

The display device according to (1), in which the second driver performs the application of the second precharge signal voltage for each 1-horizontal period while the second driver thins the application of the first precharge signal voltage for each of the predetermined horizontal periods, and the second driver uniformly assigns, to an application period of each of the image signals, a whole or a portion of a time generated as a result of the thinning of the first precharge signal voltage.

(6)

An electronic apparatus with a display device, the display device including:

a pixel array section including a plurality of pixels that are disposed two-dimensionally in a matrix, and a signal line that is disposed for each pixel column;

a first driver that sequentially selects each of the pixels on a row basis; and a second driver that applies, through the signal line, an image signal to each of the pixels in a pixel row that is selected by the first driver, and that inverts a polarity of the image signal at a predetermined period, the second driver sequentially applying, to the signal line, a first precharge signal voltage having a relatively large amplitude and a second precharge signal voltage having a relatively small amplitude, prior to the application of the image signal, and the second driver further controlling the application of the first precharge signal voltage to cause an amount of leak of an electric current from the pixel to the signal line due to the application of the first precharge signal voltage to become smaller than that in another period for each of predetermined horizontal periods.

(7)

A projection display apparatus with an illumination optical system, a plurality of image light generators, and a projection optical system, the plurality of image light generators modulating light from the illumination optical system to thereby generate pieces of image light, and the projection optical system projecting each of the pieces of image light that is generated at the plurality of image light generators, the projection display apparatus including:

a pixel array section including a plurality of pixels that are disposed two-dimensionally in a matrix, and a signal line that is disposed for each pixel column;

a first driver that sequentially selects each of the pixels on a row basis; and a second driver that applies, through the signal line, an image signal to each of the pixels in a pixel row that is selected by the first driver, and that inverts a polarity of the image signal at a predetermined period, the second driver sequentially applying, to the signal line, a first precharge signal voltage having a relatively large amplitude and a second precharge signal voltage having a relatively small amplitude, prior to the application of the image signal, and the second driver further controlling the application of the first precharge signal voltage to cause an amount of leak of an electric current from the pixel to the signal line due to the application of the first precharge signal voltage to become smaller than that in another period for each of predetermined horizontal periods.

This application is based upon and claims the benefit of priority of the Japanese Patent Application No. 2016-017869 filed with the Japan Patent Office on Feb. 2, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display device comprising:
a pixel array section including a plurality of pixels that are disposed two-dimensionally in a matrix, and a signal line that is disposed for each pixel column;
a first driver that sequentially selects each of the pixels on a row basis; and
a second driver that applies, through the signal line, an image signal to each of the pixels in a pixel row that is selected by the first driver, and that inverts a polarity of the image signal at a predetermined period,
the second driver sequentially applying, to the signal line, a first precharge signal voltage having a relatively large amplitude and a second precharge signal voltage having a relatively small amplitude, prior to the application of the image signal, and the second driver further controlling the application of the first precharge signal voltage to cause an amount of leak of an electric current from the pixel to the signal line due to the application of the first precharge signal voltage to become smaller than that in another period for each of predetermined horizontal periods, wherein, during non-blanking portions of the image signal, the amplitude of the first precharge signal voltage is fixed independent of a polarity of an image signal voltage of the image signal and the amplitude of the second precharge signal voltage changes according to the polarity of the image signal voltage.

2. The display device according to claim 1, wherein the second driver performs the application of the second precharge signal voltage for each 1-horizontal period while the second driver thins the application of the first precharge signal voltage for each of the predetermined horizontal periods, and the second driver omits the application of the first precharge signal voltage in a whole or a portion of a horizontal period that includes no application period of each of the image signals.

3. The display device according to claim 1, wherein the second driver performs the application of the second precharge signal voltage for each 1-horizontal period while the second driver thins the application of the first precharge signal voltage for each of the predetermined horizontal periods, and the first precharge signal voltage is a voltage value of a lowest level of the image signal or is a voltage value of a level larger than the lowest level thereof.

4. The display device according to claim 1, wherein the second driver performs the application of the first precharge signal voltage and the application of the second precharge signal voltage for each 1-horizontal period, and makes an amplitude of the first precharge signal voltage smaller than an amplitude of the first precharge signal voltage in another horizontal period, for each of the predetermined horizontal periods.

5. The display device according to claim 1, wherein the second driver performs the application of the second precharge signal voltage for each 1-horizontal period while the second driver thins the application of the first precharge signal voltage for each of the predetermined horizontal periods, and the second driver uniformly assigns, to an application period of each of the image signals, a whole or a portion of a time generated as a result of the thinning of the first precharge signal voltage.

6. An electronic apparatus with a display device, the display device comprising:

a pixel array section including a plurality of pixels that are disposed two-dimensionally in a matrix, and a signal line that is disposed for each pixel column;

a first driver that sequentially selects each of the pixels on a row basis; and a second driver that applies, through the signal line, an image signal to each of the pixels in a pixel row that is selected by the first driver, and that inverts a polarity of the image signal at a predetermined period, the second driver sequentially applying, to the signal line, a first precharge signal voltage having a relatively large amplitude and a second precharge signal voltage having a relatively small amplitude, prior to the application of the image signal, and the second driver further controlling the application of the first precharge signal voltage to cause an amount of leak of an electric current from the pixel to the signal line due to the application of the first precharge signal voltage to become smaller than that in another period for each of predetermined horizontal periods, wherein, during non-blanking portions of the image signal, the amplitude of the first precharge signal voltage is fixed independent of a polarity of an image signal voltage of the image signal and the amplitude of the second precharge signal voltage changes according to the polarity of the image signal voltage.

7. A projection display apparatus with an illumination optical system, a plurality of image light generators, and a projection optical system, the plurality of image light generators modulating light from the illumination optical system to thereby generate pieces of image light, and the projection optical system projecting each of the pieces of image light that is generated at the plurality of image light generators, the projection display apparatus comprising:

a pixel array section including a plurality of pixels that are disposed two-dimensionally in a matrix, and a signal line that is disposed for each pixel column;

a first driver that sequentially selects each of the pixels on a row basis; and a second driver that applies, through the signal line, an image signal to each of the pixels in a pixel row that is selected by the first driver, and that inverts a polarity of the image signal at a predetermined period, the second driver sequentially applying, to the signal line, a first precharge signal voltage having a relatively large amplitude and a second precharge signal voltage having a relatively small amplitude, prior to the application of the image signal, and the second driver further controlling the application of the first precharge signal voltage to cause an amount of leak of an electric current from the pixel to the signal line due to the application of the first precharge signal voltage to become smaller than that in another period for each of predetermined horizontal periods, wherein, during non-blanking portions of the image signal, the amplitude of the first precharge signal voltage is fixed independent of a polarity of an image signal voltage of the image signal and the amplitude of the second precharge signal voltage changes according to the polarity of the image signal voltage.

* * * * *